United States Patent [19]

Hartman et al.

[11] Patent Number: 4,767,090
[45] Date of Patent: Aug. 30, 1988

[54] TRIPODS

[75] Inventors: Bruce A. Hartman, Everett; Michael R. Kardack, Lynnwood; Ralph E. Ammendolia, Bellevue, all of Wash.

[73] Assignee: Kar-Hart Productions, Inc., Everett, Wash.

[21] Appl. No.: 857,711

[22] Filed: Apr. 30, 1986

Related U.S. Application Data

[63] Continuation-in-part of Ser. No. 663,872, Oct. 23, 1984, abandoned.

[51] Int. Cl.⁴ ............................................. F16M 11/38
[52] U.S. Cl. ..................................... 248/168; 248/178; 248/188; 248/188.5; 248/231; 248/231.3; 354/81; 354/293; 24/273; 24/280
[58] Field of Search .................. 248/168–171, 248/439, 173, 440.1, 165, 166, 177–188, 188.5, 188.6, 188.8, 188.9, 464, 302, 231.3, 316.2, 231; 24/280, 273, 170; 354/81, 293

[56] References Cited

U.S. PATENT DOCUMENTS

| | | | |
|---|---|---|---|
| 663,535 | 12/1900 | Essner | 248/177 |
| 769,447 | 9/1904 | McKinney | 248/188.5 |
| 1,808,848 | 6/1931 | Haynes | 248/188.5 |
| 2,550,415 | 4/1951 | Kammermeyer | 248/183 |
| 2,587,511 | 2/1952 | Nerman | 248/169 |
| 2,668,682 | 2/1954 | Dalton | 354/293 |
| 3,429,541 | 2/1969 | Herman | 248/302 |
| 3,963,207 | 6/1976 | Guasti | 248/168 |
| 4,017,049 | 4/1977 | Albee | 248/465 |
| 4,233,713 | 11/1980 | Berg | 24/170 |
| 4,641,395 | 2/1987 | Banks | 248/514 |

FOREIGN PATENT DOCUMENTS

| | | | |
|---|---|---|---|
| 807721 | 7/1951 | Fed. Rep. of Germany | 248/186 |
| 858713 | 12/1940 | France | 248/168 |
| 125324 | 6/1949 | Sweden | 248/168 |

Primary Examiner—Alvin C. Chin-Shue
Attorney, Agent, or Firm—Hughes, Cassidy & Multer

[57] ABSTRACT

Simple, durable tripods for instruments such as those employed by surveyors, cameras, telescopes, laser-based measuring devices, etc. These tripods feature a tripod head which is a single piece of material and pivotable legs with a one-piece foot and a side-by-side or triangular array of hollow posts which provides strength and rigidity at a low weight. The tripod components are fabricated principally from colorfast, impact resistant, synthetic polymers which are: dimensionally stable under varying ambient temperatures; impact resistant; resistant to chemical attack and ultraviolet degradation; and, in the case of components which move relative to each other, self-lubricating. The tripod legs may or may not be extensible; in either case the tension between each tripod leg and the tripod head is independently adjustable. Stability may be promoted by rolling bearings which are located at the upper ends of the tripod legs and are seated on complementary bearing surfaces in the tripod head. A novel overcenter type, cam-operated clamping mechanism, also useful for other purposes, is employed to lock the tripod leg assemblies together in the wanted relationship in those tripods which employ legs with one or more extensible leg assemblies. Either spike or tilting shoes may be provided to stabilize the tripod legs on the tripod-supporting stratum; a battery hanger may be attached to one of the tripod legs; and a novel arrangement coupler the instrument attaching bell of the tripod to the tripod head so that the bell will not be lost or misplaced.

3 Claims, 17 Drawing Sheets

U.S. Patent  Aug. 30, 1988  Sheet 1 of 17  4,767,090
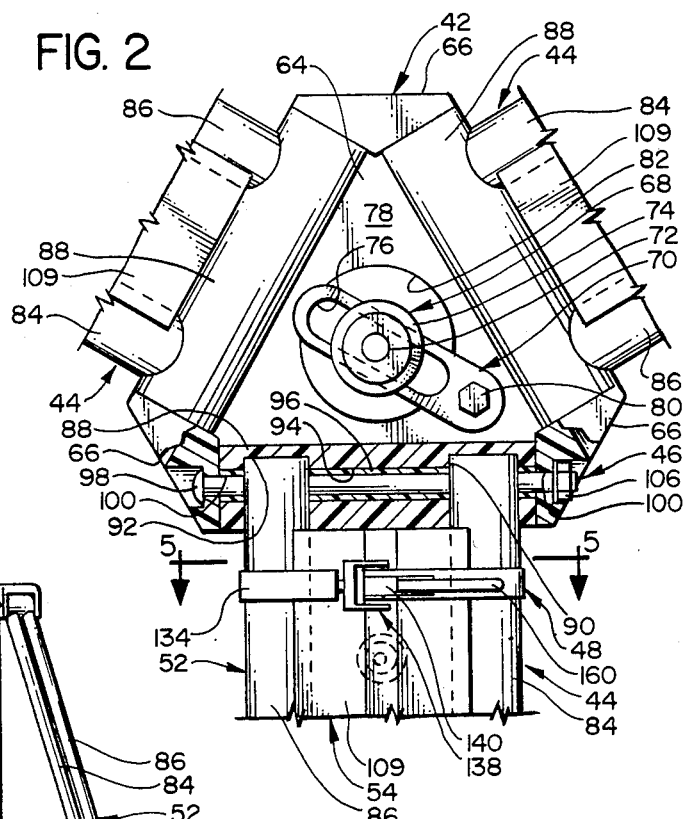
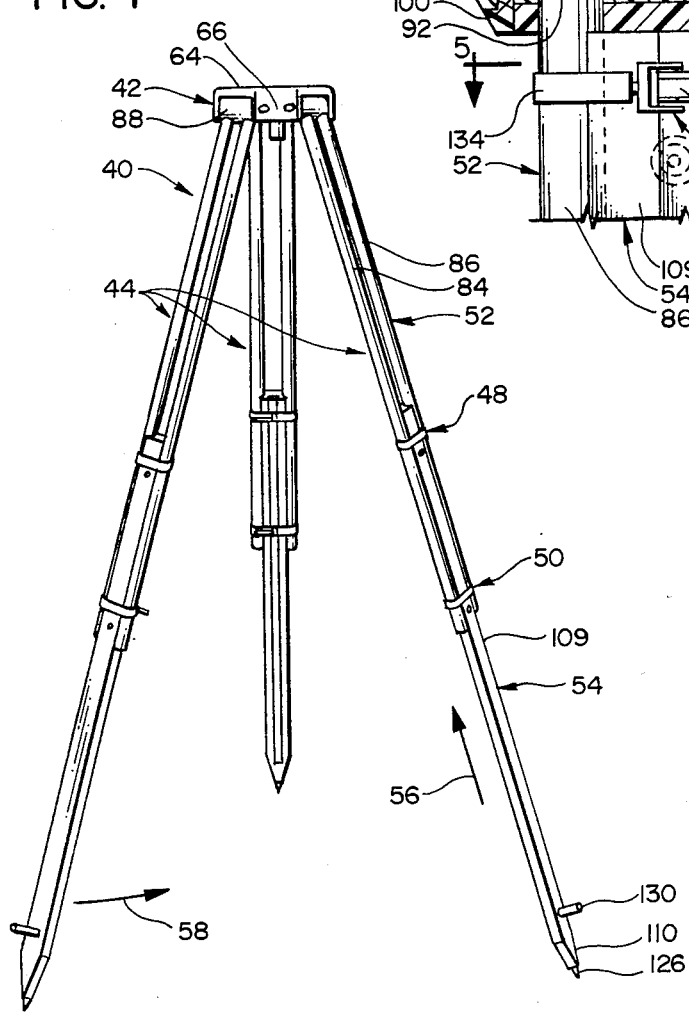

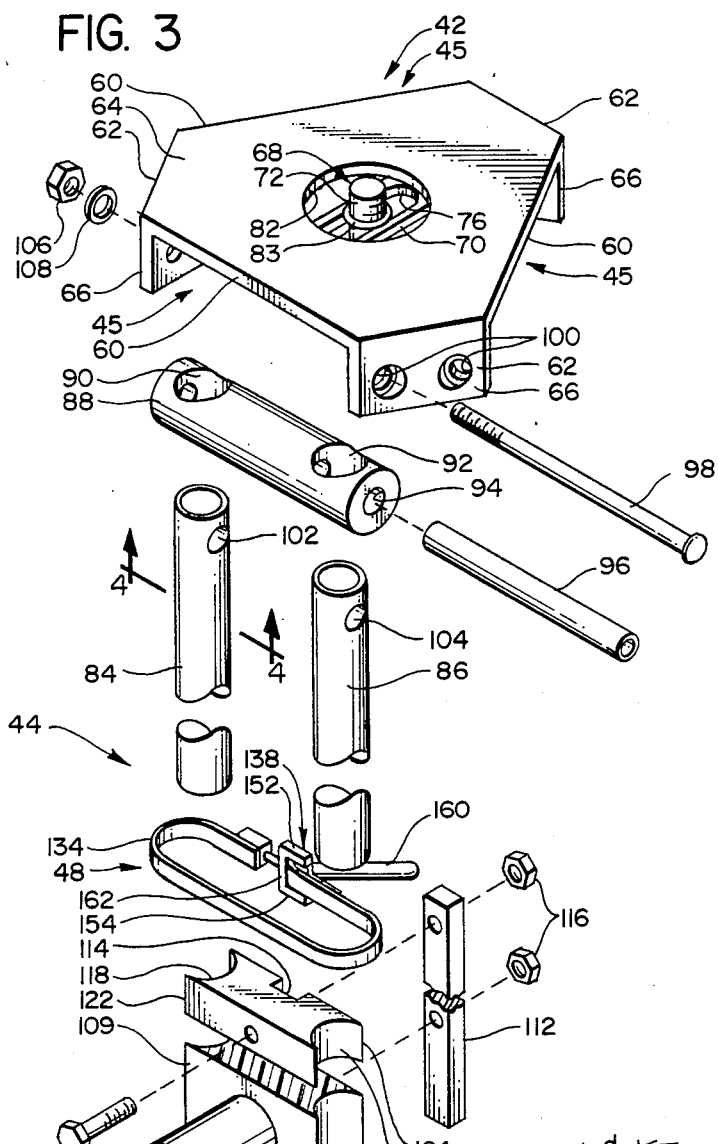
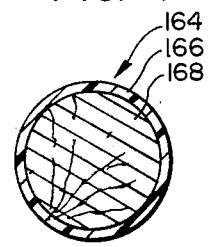
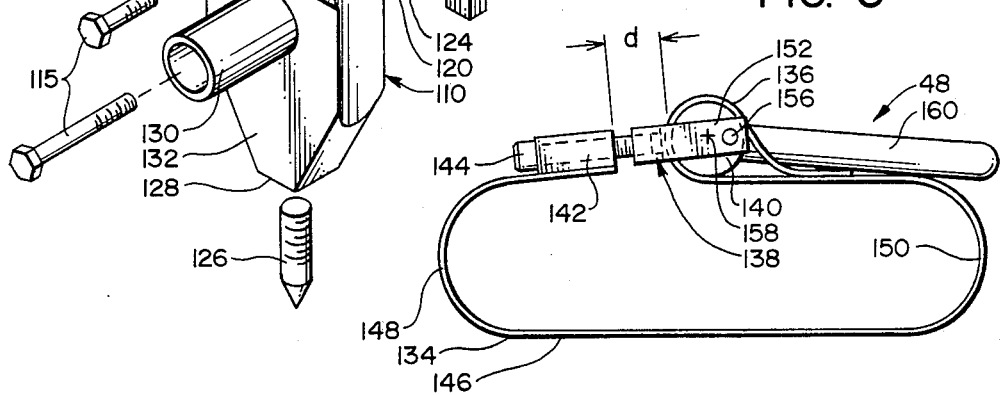
FIG. 3
FIG. 4
FIG. 5

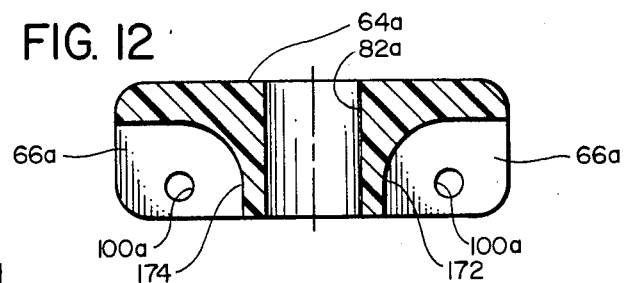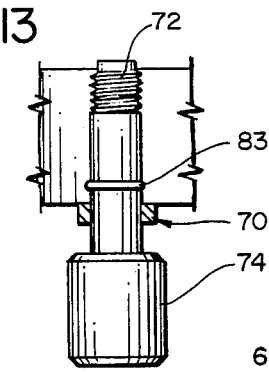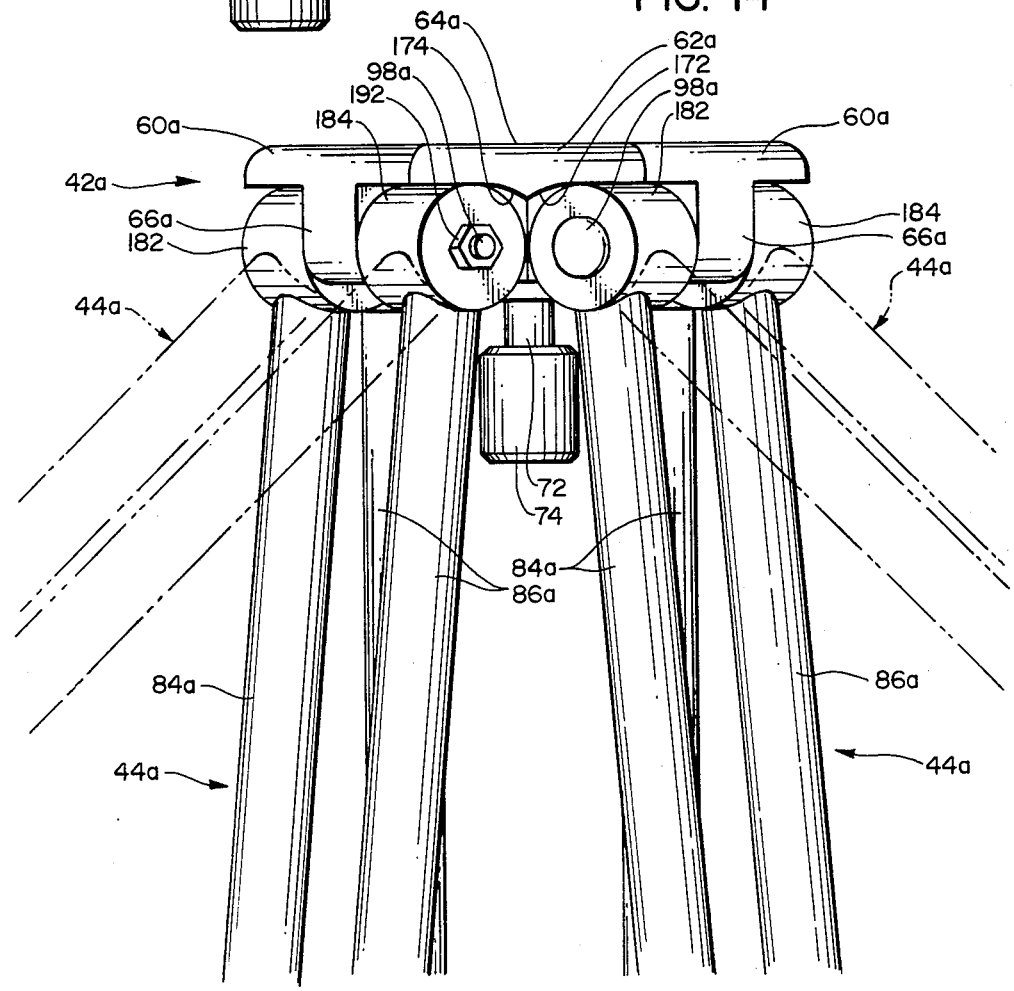

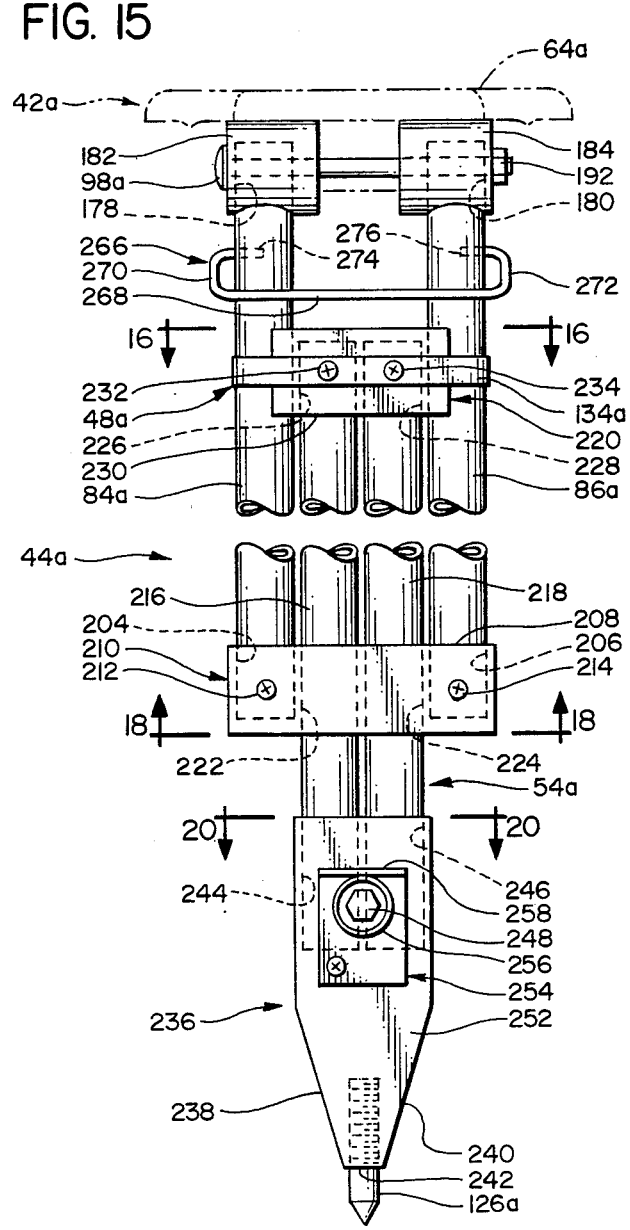

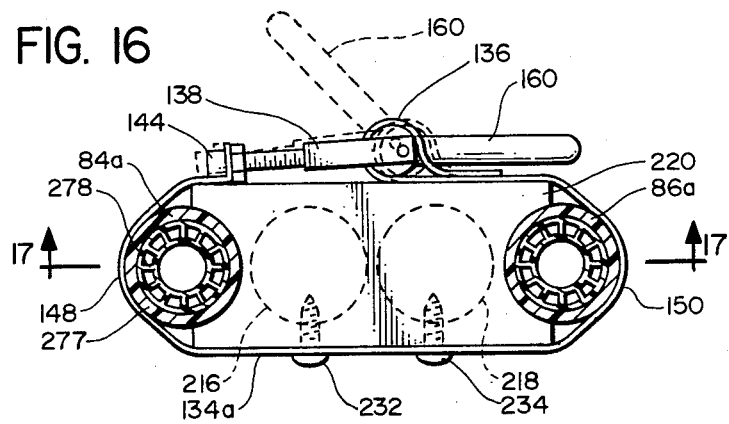
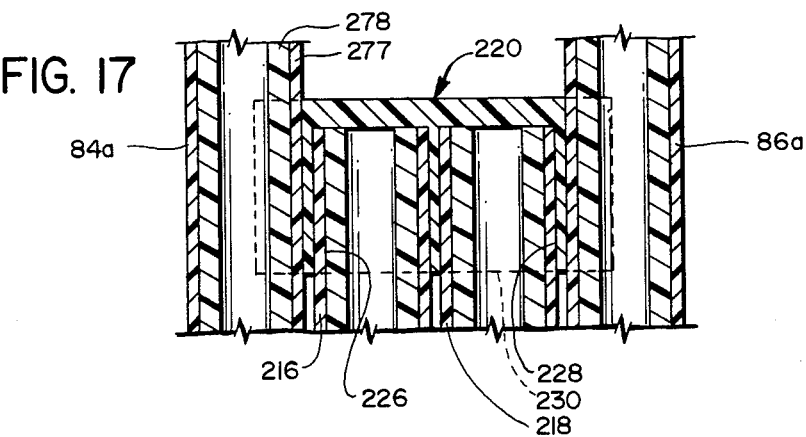
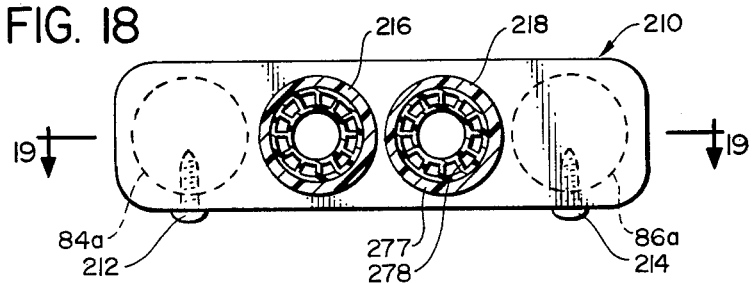

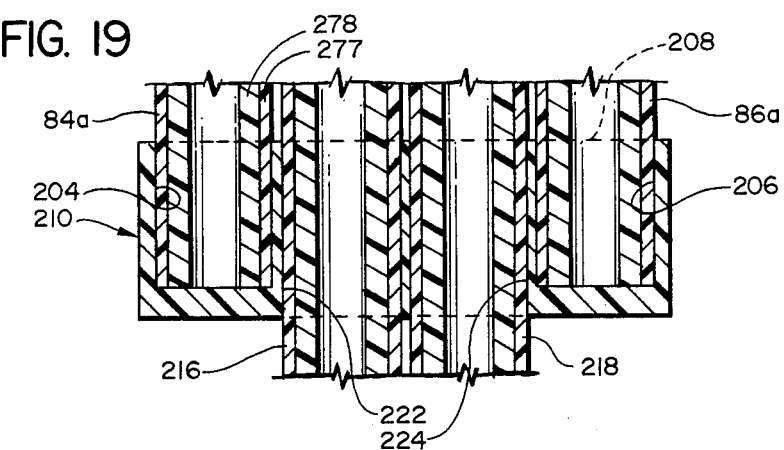
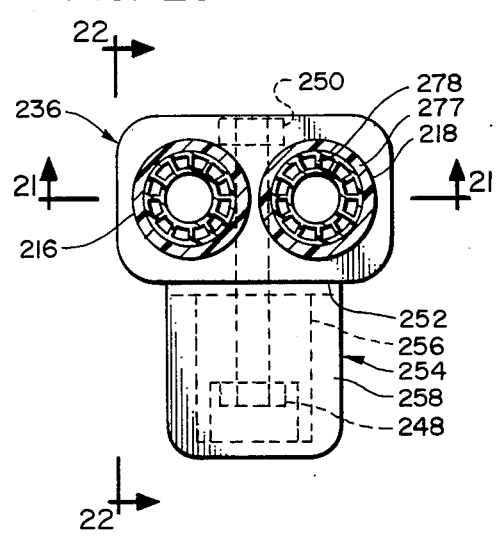
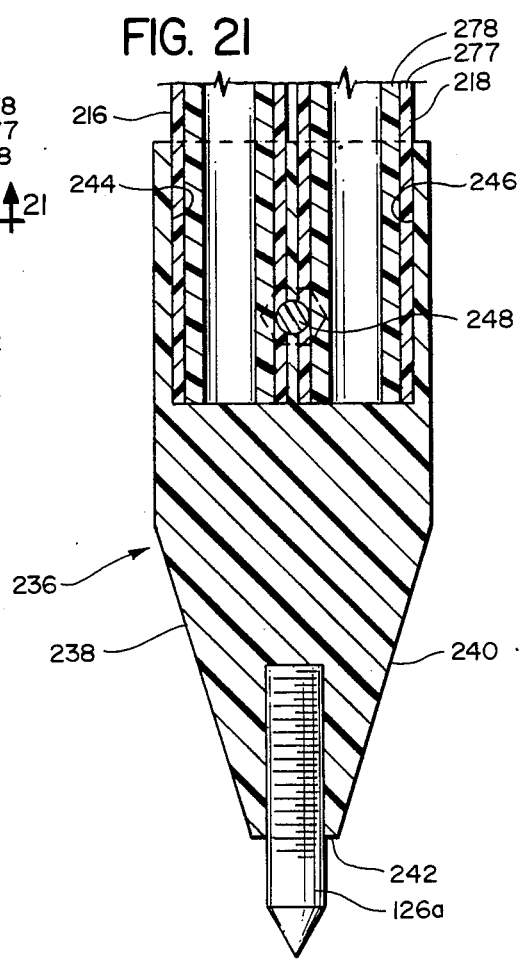

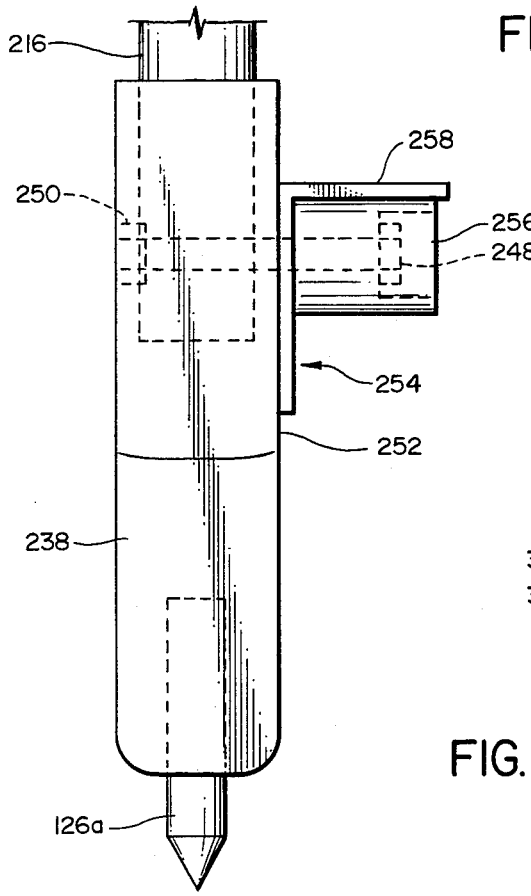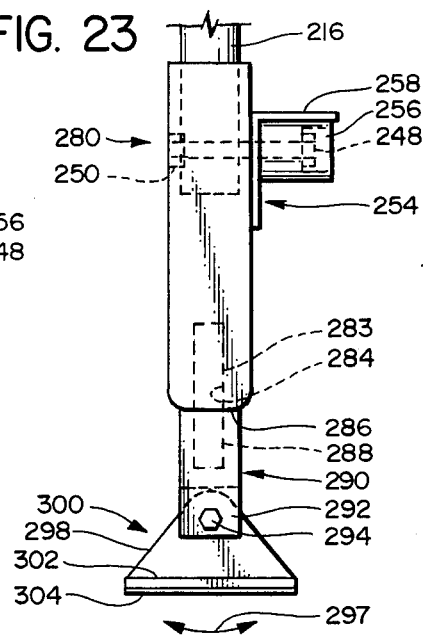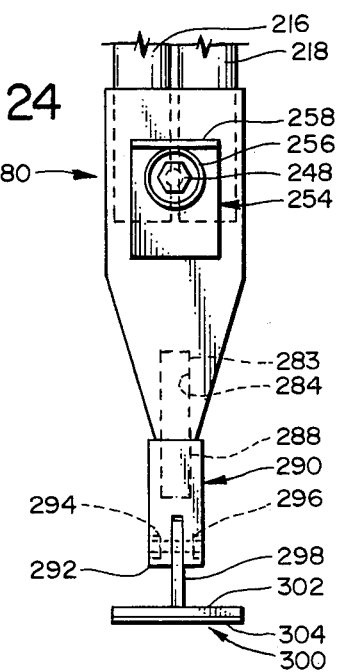

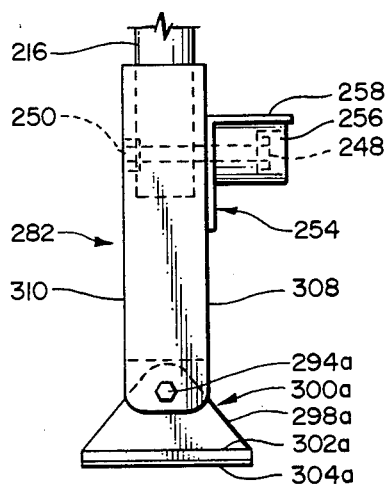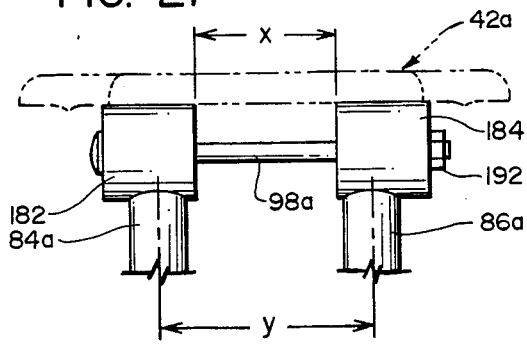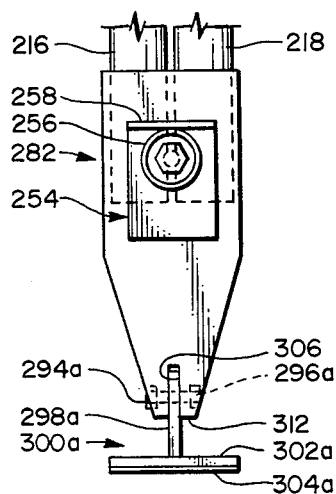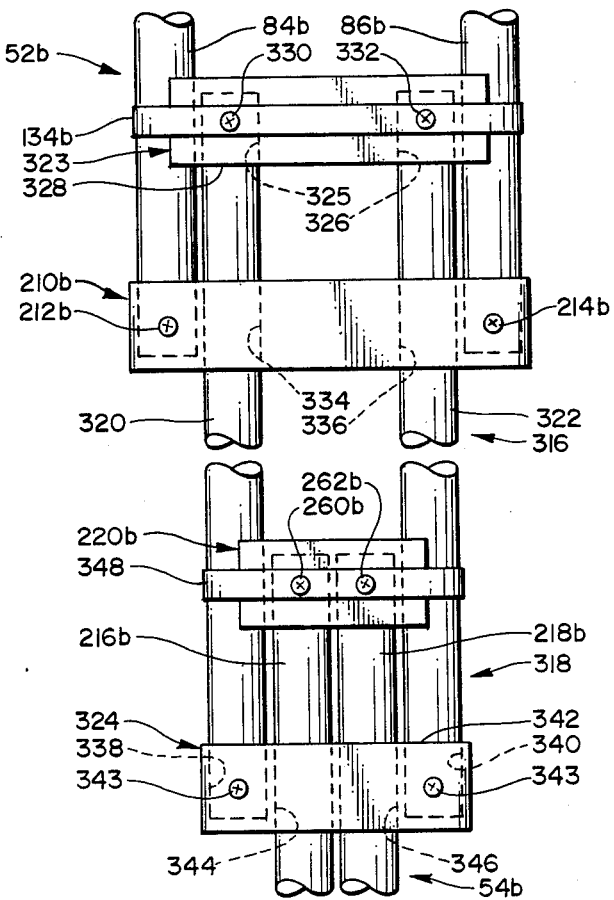

TRIPODS

RELATION TO OTHER APPLICATIONS

This application is a continuation-in-part of application Ser. No. 663,872 filed Oct. 23, 1984, now abandoned, by Bruce A. Hartman et al. and entitled SURVEYORS TRIPOD.

TECHNICAL FIELD OF THE INVENTION

The present invention relates to tripods and, more specifically to novel, improved tripods designed to support a variety of instruments in a stable manner.

As used above and hereinafter, the term "instrument" is intended to include surveyor's instruments such as levels, transits and theodolites; motion, still, and video cameras; laser-based measuring devices; telescopes; and other implements which must be solidly mounted so that their alignment will not be altered once they have been set up and/or while they are in use.

BACKGROUND OF THE INVENTION

Tripods of the character we have invented are intended to be used by surveyors and others to support instruments such as those identified above in a steady, precise orientation or alignment. Heretofore, such tripods have typically been of wooden or metallic construction. Exemplary of the heretofore proposed wooden tripods are those disclosed in U.S. Pat. Nos.: 282,182 issued July 31, 1883, to Flammang for STAND FOR PHOTOGRAPHIC CAMERAS; 588,552 issued Aug. 24, 1897, to Brownell for TRIPOD; 683,993 issued Oct. 8, 1901, to Schirber for TRIPOD OR OTHER SIMILAR STAND; and 1,863,761 issued June 21, 1932, to Neuwirth for PORTABLE SUPPORTING DEVICE. Representative, heretofore proposed tripods of metallic construction are disclosed in U.S. Pat. Nos.: 2,442,000 issued May 25, 1948, to Furnas, Jr. for TRIPOD LEG; 3,051,425 issued Aug. 28, 1962, to Homrighausen for TRIPOD WITH PLUMB; 3,589,757 issued June 29, 1971, to Mooney for AUTOMATIC LOCK FOR EXTENSIBLE CAMERA TRIPOD LEG; 3,963,207 issued June 15, 1976, to Guasti for ADJUSTABLE SUPPORT LEGS; 4,317,552 issued March 2, 1982, to Weidler for UNIVERSAL TRIPOD FOR SUPPORTING A CAMERA OR THE LIKE; and 4,453,686 issued June 12, 1984, to Ina for TRIPOD.

One of the common disadvantages of wooden tripods is that the tripod legs cannot be independently adjusted as far as their resistance to pivotable movement relative to the tripod head is concerned. Consequently, in an extreme case, one leg may be very difficult to pivot whereas another may be so loose that it will not even stay in the position to which it is pivoted. This makes the tripod awkward, and very difficult, to use; and it may even fall over and damage the instrument mounted on it.

Furthermore, metal castings are commonly employed in wooden tripods; for example, in connecting the tripod legs to its head and, if the legs are extensible, in coupling the upper and lower leg assemblies together. Typically, these castings are relatively fragile or otherwise lacking in durability. Also, because of the configurations these castings have, access to the pivot members coupling the tripod legs to the tripod head when one needs to adjust the tension between the tripod head and legs is often limited, making it difficult to effect this adjustment.

A related disadvantage is that the schemes commonly employed to connect the legs of a wooden tripod to its head involve a considerable number of components. This is a drawback from the economic viewpoint and because the coupling arrangement typically tends to loosen as the tripod is used. The resulting play between the legs and tripod head which makes it impossible for the instrument supported by the latter to be set up with the degree of precision typically required in modern, state-of-the art tripod applications.

Yet another disadvantage of wooden tripods is that their finishes are, typically, not particularly long lasting. Once the finish begins to deteriorate, water can seep into the wood. Rotting results; and, also, the wood may expand to the point where continual adjustment of the pivot members will be required. And, ultimately, the castings used in connecting the leg to the tripod head may perhaps be broken by the swelling wood.

The problems of continual adjustment and broken parts are particularly apt to occur during periodically inclement weather conditions. The wood will first swell and the moisture in it perhaps freeze, making it obviously difficult to properly adjust the tension between the leg and tripod head. Then, as the wood dries, it will shrink, perhaps loosening a tripod leg to the extent that the tripod may fall, damaging the typically expensive equipment mounted on the tripod.

Yet another weak point of the typical, heretofore available, wooden tripod is the foot. This is often a metal casting, and the area where the wooden tripod leg is connected to that casting will often rot out because of water seeping into the casting when the tripod is employed in inclement weather.

In addition, periodic tightening of the fastener holding the foot onto the tripod leg will typically be required in this wooden leg and metal foot arrangement. This progressively crushes that part of the leg in the tripod foot until, ultimately, the foot cannot be securely connected to the tripod leg. Again, this may result in enough play in the tripod leg to keep the instrument mounted on the tripod from being aimed or otherwise set up with the requisite degree of accuracy.

The metal tripods which have heretofore been available are typically copies of the earlier developed wooden tripods. Metal tripods are fabricated of an aluminum or other lightweight alloy except for those utilized to mount the surveying levels used by contractors. Those tripods are made from steel. Tripods of aluminum and similar alloys are easily dented and otherwise damaged. Both those tripods and the ones fabricated from steel have such large coefficients of thermal expansion as to typically make them unsuitable in circumstances where a high degree of precision is required because of the dimensional changes that occur as ambient temperatures vary.

In addition, rivets are commonly employed to fasten components of heretofore available metal tripods together. Riveted connections have a marked tendency to loosen. As discussed repeatedly above, this loosening is unacceptable in many applications because play between the tripod components may make it impossible to maintain an instrument mounted on the tripod in sufficiently precise alignment to be acceptable under modern day standards.

This susceptibility to denting and other damage is a disadvantage which is common to most wooden tripods because heads of wooden tripods are customarily fabricated from brass or aluminum. Damage to the tripod head may make it difficult or impossible to properly seat an instrument or to rotate or otherwise move or slide it along the instrument-supporting surface on the tripod head. And, in extreme cases, a damaged instrument supporting platform may even cause damage to the instrument itself as the latter is mounted on the tripod head.

Compounding the above-discussed drawbacks of heretofore available wooden and metal tripods are the conditions to which those tripods are commonly subjected. They are often used out-of-doors in inclement weather and not uncommonly in environments in which they are contacted by caustics, acids, and other corrosive materials. Furthermore, they are often transported over rough terrain, dropped, or otherwise subjected to handling which may damage adjustment screws or knobs or other projecting tripod components, subject wooden components to breakage, and similarly subject metal components to denting or bending. Any of these forms of damage can seriously effect the usefulness of the tripod or even make it useless, particularly in modern applications in which a high order of precision is so often required.

Another disadvantage of both wooden and metal tripods is that the bell—i.e., the fastener employed to couple an instrument to the tripod head—is not in any manner connected to the tripod. This makes it easy to lose or misplace the bell, disabling the tripod until that component can be replaced.

In addition to the disadvantages discussed above, tripods now commonly in use are difficult to adjust in height since a clamping screw or the like must be rotated to loosen the telescoping parts of each leg for adjustment. Only a small amount of corrosion or a slight bending of a screw will make it difficult to rotate. And turning a knob or thumbecrew to rotate the screw is time-consuming and can be awkward if one has only one hand free and is supporting the tripod and/or instrument being mounted on it with the other during that operation. Furthermore, clamping of the legs at a single point by a screw pin causes undesirable wear at that point.

Also, angular adjustment of prior art tripod legs is possible, but only within a limited range. This presents a problem when surrounding terrain necessitates a great range of angular position.

And, while the height and angular positions of the legs are being adjusted, smooth movement of all parts involved is desirable, but seldom possible because of the materials used, particularly as wood and metal roughen with exposure to the elements.

The lubrication of parts they require is another drawback of heretofore available tripods because this involves an added expenditure of time and money.

All in all then, the tripods typically heretofore available for supporting precision instruments such as those identified above have a number of disadvantages which make those tripods of less than optimum utility, or even totally unsuitable, for modern applications in which a high degree of precision is required.

SUMMARY OF THE INVENTION

We have now invented, and disclosed herein, certain novel, improved tripods which are free of the above-discussed disadvantages and drawbacks of the wooden and metallic tripods heretofore available. This makes those tripods eminently suitable for applications in which the instrument mounted on the tripod must be aimed or otherwise set up with a high degree of accuracy.

Like the heretofore available wooden and metal tripods, those disclosed herein include a tripod head with a platform on which the desired instrument can be mounted; a bell for securing the instrument to the mounting platform; three tripod legs (which may or may not be extensible); and pivot mechanisms for pivotably connecting the upper ends of the tripod legs to the tripod head at locations spaced equiangularly around the periphery of that head. The surface of the tripod head mounting platform may be flat to accommodate a surveyor's instrument or other instrument with a flat base. Or, as another example, the instrument mounting platform may be dished to accommodate panning mechanism for a video or motion picture camera.

To a large extent, these components of our novel tripods exposed to the environment are fabricated from synthetic polymers which are impact resistant, dimensionally stable under a wide range of ambient temperatures, and resistant to moisture and chemical attack as well as ultraviolet degradation. Consequently, our novel tripods are capable of solidly supporting instruments mounted on them, even under drastically changing temperature conditions. They are also virtually immune to attack by moisture and corrosive chemicals and to the damage which heretofore available tripods suffer when they are dropped or otherwise roughly handled. Furthermore, an appropriate pigment can be incorporated in the chosen polymer, making it easy to fabricate tripods which will comply over their entire service life with OSHA, Department of Transportation and other regulations requiring that the tripods used for certain purposes be a bright, highly visible yellow (safety yellow) or orange (international orange). This is a marked advantage over conventional tripods which are painted or otherwise coated with compositions that show a marked tendency to fade and to rub or peel off as the tripod is used.

Also, our novel tripods may employ an arrangement for pivotably fixing the upper ends of the tripod legs to the tripod head which permits the tension between each tripod leg and the tripod head (i.e., the force required to pivot the leg relative to the tripod head) to be independently adjusted. This contributes significantly to the setting up of the tripod and to its ability to provide a stable, solid support for the instrument mounted on the tripod head because the adjustments made to one leg do not result in another leg being loosened or overtightened. This ability of our novel tripods to provide stable, play free support for the instrument mounted on the tripod is further enhanced by novel arrangements which can be employed to pivotably connect the tripod legs to the tripod head and which provide large bearing surfaces between the legs and head of the tripod.

Also, tension adjustments need to be only infrequently made even if the tripod is roughly handled, principally because the pivot members connecting the tripod legs to the tripod head rotate with the legs and because Nylok or comparable retainers which tend to remain in adjustment for long periods of time are employed to secure the pivot members in place.

Another advantage of the novel arrangement we may use to pivotably connect the tripod legs in place is also attributable to our use of rolling type bearings which contribute to the stability of our novel tripods. The upper ends of the tripod leg rods or posts we use in tripods employing those bearings are fitted into complementary recesses in these bearings. This keeps those ends of the posts from being pinched or crushed as the upper ends of the heretofore available tripod legs typically are.

Furthermore, the recesses in these bearings may be advantageously located closer to one end of the bearing than the other. This allows tripod legs of different widths to be accommodated by bearings of a single size, simply by turning the latter end-to-end.

Still another advantage of the novel arrangement we employ for pivotably fixing the tripod legs to the tripod head is its simplicity. The pivot member couples both the upper ends of the posts making up the tripod legs and the bearings in which they are seated to the tripod head; as a consequence, only that pivot member and the retainer employed to tension it are required to fix the tripod leg to the tripod head.

Also contributing to the superiority of many of our novel tripods is a one-piece tripod head construction which furnishes: (1) the platform on which the instrument supported by the tripod is mounted; (2) cutouts providing bearing surfaces for the rolling bearings in which the upper ends of the tripod leg posts are seated; and (3) integral, depending flanges through which the pivot members extend to pivotably connect the upper ends of the tripod legs to the tripod head.

We pointed out above that extensible legs may be employed in the novel tripods we have invented and disclosed herein. Typically, the upper assembly of the extensible legs will consist of the two above-discussed, parallel, elongated, spaced apart, tubular posts seated in roller-type bearings. The lower leg assembly employed therewith is located between the posts of, and is rectilinearly extendable and retractable relative to, the upper leg assembly. The lower leg assembly will typically be of post (or rod) and guide construction with, in certain embodiments of our invention, the post and guide functions being combined in a single component.

The guide of the lower leg assembly, or that guide plus one at the lower end of the upper leg assembly, are relied upon to guide the lower leg assembly relative to the upper one as the lower leg assembly is extended and retracted.

In embodiments of our invention designed so that the tripod mounted instrument can be located at a greater height above the tripod supporting stratum, a third, also extensible, leg assembly or an extensible auxiliary post is provided to increase the length of the tripod legs.

Another feature common to the tripods disclosed herein is a unique, cam-operated, overcenter type clamping mechanism. This device is utilized to lock the upper and lower assemblies of the tripod legs (plus any intermediate leg assemblies) together in a retracted position or in any one of the infinite number of positions to which one leg assembly can be extended relative to another. One clamping mechanism is employed at the upper end of, and carried by, the low leg assembly. A duplicate clamping mechanism may be added at the lower end of that assembly.

These novel clamping mechanisms, which are of general utility and useful in many applications in addition to those described herein, have the advantage of being simple and the capability of positively locking the tripod leg assemblies together in the wanted relationship. In addition, the components of those mechanisms can be predominently located on the inner sides of the tripod legs, thereby avoiding any projecting components which might be damaged if struck or if the tripod was dropped, etc.

The cam-operated clamping mechanism includes a cam strap which elimates the wear problem associated with single point clamping by a screw pin. The clamp straps exert pressure evenly around the leg assembly for secure locking action. The lever actuated cam locks are quickly released and secured, and the lever actuators lie flat against the leg assembly when in the locked position. Together, the upper and lower leg assemblies and the cam lock form a compact tripod leg with no projecting parts, which is advantageous for the reasons discussed above.

As discussed above, the upper leg assembly of the tripods we have invented will typically include a pair of parallel, supporting posts fitted, at their upper ends, into bearing members of the rolling type and, optionally, a fixed guide into which the lower ends of the posts are seated. The lower leg assembly fitted between the posts of the upper leg assembly may be of the same parallel post construction. In that case, the posts of the lower leg assembly will extend through appropriate bores in the fixed guide at the lower end of the upper leg assembly, and the clamping mechanism employed to lock the two leg assemblies together will be carried by a guide fixed to the upper ends of the lower leg assembly posts and slidable along the posts of the upper leg assembly.

Alternatively, and was also indicated above, the functions of those posts and that guide may be combined in a single, elongated guide and post member. That member will have arcuate grooves in its opposite edges, those grooves cooperating with the posts of the upper guide assembly to guide the lower leg assembly therealong as the latter is extended and retracted. In these embodiments of our invention, an aluminum or other stiff truss can advantageously be incorporated into the post and guide member to increase its rigidity and, as a consequence, promote the stability of the tripod in which the leg assembly is incorporated.

We pointed out above that the posts of the upper leg assembly and of the lower leg assembly in which that construction is utilized will typically be hollow tubes of a synthetic polymer. In either case, the leg assembly is stable, strong, and resistant to bending and far more reliable than the wooden, aluminum, etc. legs of heretofore available tripods.

Our novel tripods also feature a one-piece, sometimes integral, foot fabricated from a synthetic polymer rather than the cast metal foot heretofore commonly employed in competitive tripods. This innovation is important because it is much more durable and significantly less susceptible to damage than those cast metal shoes and associated fastening devices hereto employed.

Either a pointed spike or a tilting shoe can be fixed to the lower end of the tripod leg foot, depending upon the surface on which the tripod is to be set up. A platform for driving the spike into the supporting stratum can be attached to the outer side of the tripod foot.

Yet another important feature of the tripods disclosed herein is a novel system which couples the instrument attaching bell of the tripod to the bracket supporting that component from the tripod head. This coupling arrangement allows the bell to be positioned in any one of an infinite number of locations relative to the tripod head to optimize the positioning of the tripod mounted instrument on that head. At the same time, the arrangement in question fastens the bell to its supporting bracket so that the bell cannot be lost or misplaced.

And still another feature of our novel tripods is a hanger or bail that can be employed to support an instrument powering battery pack from one of the tripod legs. That a battery can be supported from the tripod at all is unusual because, in the case of prior art tripods with their lack of rigidity and stability, the added weight of the battery may destroy the alignment of the instrument mounted on the tripod once the latter has been set up.

OBJECTS OF THE INVENTION

From the foregoing, it will be apparent to the reader that one important, and primary, object of the invention resides in the provision of novel, improved tripods for surveyor's instruments and for such other instruments as cameras, laser-based measuring devices, and the like.

Other important, but more specific, objects of our invention reside in the provision of tripods in accord with the preceding object:

(1) which are relatively immune from attack by the elements, by corrosive chemicals, and by ultraviolet radiation;

(2) which provide, a solid, stable, free-of-play support for an instrument mounted thereon;

(3) which are not apt to be damaged if dropped, struck, or subjected to rough handling;

(4) which have a long useful service life;

(5) which include a leg mounting arrangement that makes it possible to independently adjust the resistance to pivotable movement of each tripod leg relative to the tripod head;

(6) which are dimensionally stable under widely varying temperature conditions;

(7) which can be easily and quickly set up and taken down;

(8) which do not require lubrication, are color fast, and are otherwise maintenance free;

(9) which employ a novel cam-operated clamping mechanism in those embodiments having extensible legs to securely lock the leg assemblies together in a retracted, or extended, relationship;

(10) which are essentially free of projecting parts that might be damaged or broken if they were struck or the tripod dropped;

(11) which are free of components that might be damaged or bent;

(12) which are capable of having an instrument powering battery supported therefrom without causing misalignment of the instrument mounted on the tripod;

(13) which have a novel arrangement that keeps the bell employed to secure an instrument on the tripod head from being lost or misplaced.

(14) which employ a small number of relatively simple parts.

Other important objects and features and additional advantages of our invention will be apparent to the reader from the foregoing and the appended claims and as the ensuing detailed description and discussion proceeds in conjunction with the accompanying drawing.

BRIEF DESCRIPTION OF THE DRAWINGS

In the drawing:

FIG. 1 is a perspective view of one exemplary tripod embodying features of the present invention, the tripod being shown with its extensible/retractable leg assemblies partially extended;

FIG. 2 is a fragmentary bottom view, partly in section, of the exemplary tripod shown in FIG. 1; it is more specifically a view looking upward at the tripod head and depicting details of the pivotal connection between the tripod head and the tripod legs and also illustrating details of a bell mounted on the underside of the head and employed to secure the instrument being mounted on the tripod to the tripod head;

FIG. 3 is a fragmentary, exploded, perspective view of the tripod shown in FIG. 1;

FIG. 4 is a cross-sectional view, taken substantially along line 4—4 in FIG. 3, and depicting one type of optional construction that can be used for certain tubular leg components of the tripod;

FIG. 5 is a view, taken substantially along line 5—5 in FIG. 2, to show the details of an adjustable tension clamping mechanism used to clamp the upper and lower assemblies of the tripod legs together in any given selected extension of those legs;

FIG. 12 is a vertical section through the tripod head taken substantially along line 12—12 of FIG. 9 with the left and right halves of the section being folded downwardly and so offset as to lie in a common vertical plane;

FIG. 13 is a side view, partially in section and taken substantially along line 13—13 of FIG. 9, illustrating details of the instrument attaching mechanism employed to attach surveying or other instruments to the tripod head;

FIG. 14 is a fragmentary side view of the tripod shown in FIGS. 6 and 7 with the left- and right-hand tripod legs as viewed in the drawing in solid lines in a first symmetrical angular position relative to the tripod head and in phantom lines in a second symmetrical angular position relative to the head;

FIG. 15 is a fragmentary front view of a tripod leg employed in the tripod illustrated in FIGS. 6 and 7;

FIG. 16 is a plan view, partially in section and taken substantially along line 16—16 of FIG. 15, and depicting details of: (i) a slidable, lower tripod leg assembly guide; (ii) the tubular posts of that tripod leg assembly; and (iii) the clamping mechanism illustrated in FIG. 5;

FIG. 17 is a section, taken substantially along line 17—17 of FIG. 16, with the clamping mechanism removed for purposes of clarity and to depict in more detail the slidable guide of the lower tripod leg assembly;

FIG. 18 is a bottom view, partially in section and taken substantially along line 18—18 of FIG. 15, depicting details of a fixed guide incorporated in the upper assembly of the tripod leg;

FIG. 19 is a sectional view, taken substantially along line 19—19 of FIG. 18, and depicting further details of the fixed, upper tripod leg assembly guide;

FIG. 20 is a top view, partially in section and taken substantially along line 20—20 of FIG. 15, and illustrating details of a foot attached to the bottom end of the lower tripod leg assembly;

FIG. 21 is a sectional view, taken substantially along line 21—21 of FIG. 20, depicting additional details of the foot attached to the lower tripod leg assembly;

FIG. 22 is a side view of the foot, looking substantially along line 22—22 of FIG. 20;

FIG. 23 is a side view, similar to FIG. 22, of a modified foot suitable for use when the tripod is to be utilized on a paved or other surface that cannot be penetrated by the metal drive points commonly employed with surveyor and other tripods;

FIG. 24 is a front view depicting further details of the modified foot assembly shown in FIG. 24;

FIGS. 25 and 26 are, respectively, side and front views similar to FIGS. 23 and 24, but depicting yet another modified foot assembly that can be utilized with tripods embodying the present invention;

FIG. 27 is a fragmentary vertical view of an upper tripod leg assembly similar to FIG. 15, but depicting certain roller-type bearings also shown in that Figure turned end-for-end to vary the spacing between the upper tripod leg assembly posts; this Figure emphasizes the modular nature of the present invention which permits the same structural components to be used in tripods of different sizes;

FIG. 28 is a fragmentary front view similar to FIG. 15, but illustrating a modified form of tripod leg assembly which has two extensible leg assemblies and two clamping mechanisms for locking those leg assemblies to each other and the upper of the two extensible leg assemblies to a non-extensible tripod leg assembly;

DETAILED DESCRIPTION OF THE INVENTION

Figure 6:
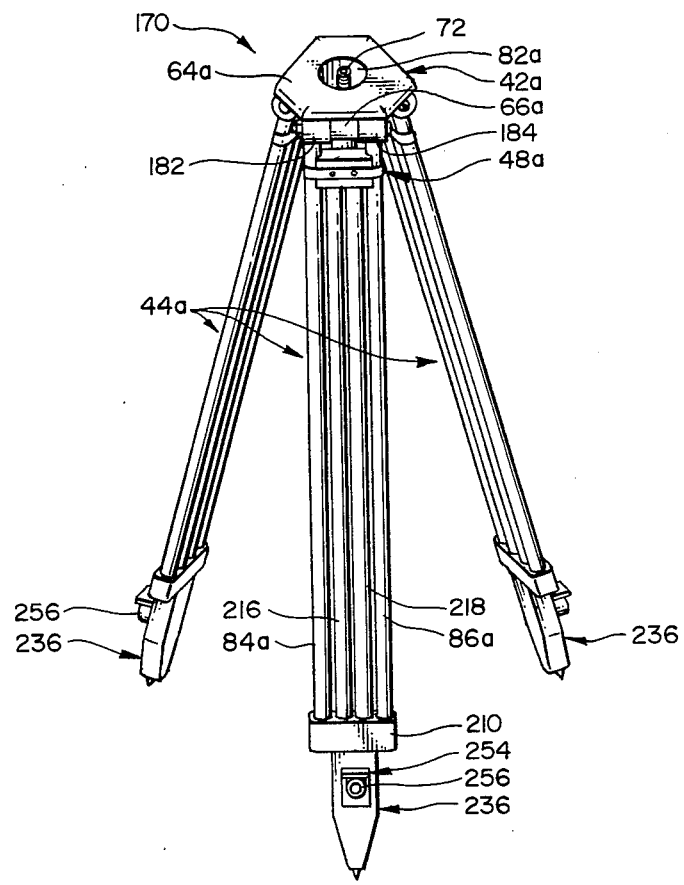
FIG. 6 is a perspective view similar to FIG. 1, but illustrating a modified tripod also embodying features of the present invention, the tripod being shown with its legs in a fully retracted or non-extended configuration.

Referring now to the drawing, FIGS. 1-3 depict a tripod 40 constructed in accord with, and embodying, the principles of the present invention. The major components of tripod 40 include a tripod head 42 and three extensible tripod legs 44. The upper ends of tripod legs 44 are pivotably fixed to the head 42 of tripod 40 at intervals or locations 45 which are equiangularly spaced around the periphery of the tripod head.

Also included in tripod 40 at each of the locations 45 referred to above is a novel arrangement 46 for pivotably connecting the upper end of the tripod leg 44 at that location to the tripod head 42. This arrangement is so designed that the resistance to pivotable movement of each tripod leg can be independently adjusted. The result is that the tripod can be easily collapsed and opened (or spread); yet the tripod legs will not become so loosely hinged that they will collapse, become full of play, or otherwise detract from the stability of the tripod.

Finally, tripod 42 includes, for each of the three tripod legs 44, upper and lower, overcenter type, cam-operated clamping mechanisms 48 and 50. These are employed to lock the upper and lower leg assemblies 52 and 54 of each tripod leg 44 in an extended relationship such as that shown in FIG. 1 or in a retracted relationship in which the lower leg assembly 54 has been displaced toward the upper leg assembly in the direction indicated by arrow 56 in FIG. 1.

With legs 44 thus retracted and pivoted toward the vertical centerline of tripod 40, as indicated by arrow 58 in FIG. 1, tripod 40 is collapsed into a configuration in which it is easily handled whereas, in the illustrated configuration with legs 44 spread and extended, the tripod is capable of furnishing stable, solid support for a precision instrument mounted on tripod head 42.

Referring now most particularly to FIG. 3, the head 42 of tripod 40 is configured as an irregular hexagon having long sides 60 alternating with short sides 62. In one exemplary tripod of the character illustrated in FIGS. 1-3, the longer sides 60 of tripod head 42 are 5.25 inches wide; and the shorter sides 62 are 2.75 inches wide.

As can best be appreciated from FIG. 3, the hexagonally configured portion of tripod head 42 provides a platform 64 on which a surveying instrument or other device of the character identified above can be mounted. Depending from the platform 64 of tripod head 42 at equiangularly spaced locations therearound are three tripod leg mounting flanges 66 of identical character.

Associated with tripod head 42, and best shown in FIGS. 2 and 3, are a bell 68 for securing the wanted instrument to the platform 64 of tripod head 42 and a straplike mounting bracket 70 for the bell.

Bell 68 has a vertically extending, threaded shaft 72 and an operator manipulatable member such as the illustrated knob 74. This knob is employed to rotate shaft 72 and thereby thread it into a complementary socket on the bottom side of the instrument (not shown) being mounted on the platform 64 of tripod head 42.

The shaft 72 of bell 68 extends upwardly through an elongated slot 76 in bell-supporting bracket 70. That bracket is pivotably fixed at one end to the bottom side 78 of tripod head platform 64 as by the illustrated threaded retainer 80 which may be a polyamide (e.g., Nylon) screw. This illustrated, pivot and slot arrangement allows the shaft 72 of bell 68 to be shifted to any one of an infinite number of positions in a central opening 82 through the platform 64 of tripod head 42. This opening 82 is much larger in diameter than the shaft 72 of bell 68, allowing the latter to be so positioned as to optimally locate the instrument being mounted on the platform 64 of the tripod head.

Bell-supporting bracket 70 is dimensioned so that it spans the central opening 82 through tripod head 42 irrespective of the angular position assumed by that bracket. This ensures that both ends of the bracket will engage the bottom side of tripod head 42 when an instrument is mounted on the tripod and, consequently, that the instrument will be solidly secured (or clamped) to the tripod.

As is shown in FIG. 3, an O-ring 83 surrounds the shaft 72 of bell 68 at a location above the bell-supporting bracket 70. This O-ring, which is seated in a square cut groove (not shown) around the periphery of shaft 72, keeps the bell from dropping out of the bracket while the knob 74 of the bell performs the same function when the tripod is inverted. Thus, the bell-supporting bracket 70 is trapped between knob 74 and O-ring 83, keeping the bell with the tripod at all times without inhibiting its ability to be manipulated to any desired location within the confines of the opening 82 through the instrument-supporting platform 64 of tripod head 42.

Referring now most particularly to FIGS. 2 and 3, each of the three identical, extensible legs 44 of tripod 42 includes the above-referred to upper leg assembly 52 and lower leg assembly 54. The former is composed of two, elongated, parallel, hollow posts (or rounds) 84 and 86 and a cylindrical cross member or brace 88 which also serves as an axle or pivot member housing as will hereinafter become apparent. The upper ends of posts 84 and 86 are seated in vertically oriented apertures 90 and 92 extending through cross member 88.

Cross member 88 also has a longitudinal bore 94 which extends from end-to-end of the cross member and is concentric with its axial centerline.

The upper leg assembly 52 of each tripod leg 44 is pivotably fixed to the head 42 of the tripod at one of the equiangularly spaced locations 45 therearound by an elongated, headed, pivot member or axle 98 which is best shown in FIG. 3 and is a component of leg-to-head connecting arrangement 46. Pivot member 98 extends through aligned apertures 100 in adjacent, depending, tripod head flanges 66; through bushing 96; and through apertures 102 and 104 in the upper ends of upper tripod leg assembly posts 84 and 86 to pivotably couple those posts and cross member 88 to the tripod head 42.

A retainer such as the illustrated nut 106 is threaded on the end of pivot member 98 against a washer 108 to clamp depending tripod head flanges 66 against the ends of cross member 88. This generates frictional force between those flanges and the ends of cross member 88 to stabilize the pivotably mounted tripod leg in the collapsed or spread position to which it is pivoted. The magnitude of this frictional force can be adjusted by tightening or loosening nut 106.

Turning now to FIGS. 1 and 3, the lower leg assembly 54 of each of the three tripod legs 44 includes an elongated, generally rectangular sectioned, guide and post member 109 which is tapered at its lower end to form an integral foot 110. Also included in each lower tripod leg assembly 54 is an elongated, straplike, truss 112. This truss is flush-mounted in a recess 114 on the back or inner side of the leg assembly, and it is retained in that recess by bolts 115 and nuts 116.

Truss 112 will typically be fabricated from aluminum or a comparable stiff material. The truss is optionally employed to strengthen, add rigidity to, and prevent bending of the lower tripod leg assembly guide and post member 109.

Arcuate grooves 118 and 120 are formed in the opposite edges 122 and 124 of each lower tripod leg assembly guide and post member 109. These grooves extend the length of that component.

The parallel posts 84 and 86 of upper tripod leg assembly 52 are seated in grooves 118 and 120 as is apparent from FIGS. 1 and 2. Thus, upper leg assembly posts 84 and 86 cooperate to guide lower leg assembly guide and post member 109 in the wanted rectilinear path as it is extended and retracted with respect to the upper tripod leg assembly.

To prevent the legs 44 of tripod 40 from slipping after the tripod has been set up with the legs spread as shown in FIG. 1, for example, a pointed spike 126 is threaded into the bottom 128 of the foot 110 at the lower end of each lower tripod leg assembly 54. A drive peg or platform 130 which can be stepped upon to press the spike 126 into the stratum on which the tripod is erected is secured to the outer side 132 of each foot 110 by the bolts and nuts 115 and 116 discussed above.

Turning now to FIG. 5, each of the two clamp mechanisms 48 and 50 employed to lock the upper and lower assemblies 52 and 54 of a tripod leg 44 together includes a flexible, typically metal strap 134 with a loop 136 formed in one end thereof; a U-shaped, cam-supporting bracket 138; a cam 140 rotatably supported from that bracket in the loop 136 of flexible strap 134; a stationary bracket 142 fixed to the opposite, free end of flexible band or strap 134; and a threaded adjusting member 144.

The two cam-operated clamping mechanisms 48 and 50 are identical and associated with lower tripod leg assembly guide and post member 109 in the same fashion; and the two mechanisms are operated in the same manner to clamp the upper and lower leg assemblies together. Consequently, and for the sake of brevity, only the upper clamping mechanism 48 will be described in detail herein.

The flat, outer section 146 of the flexible strap 134 incorporated in clamping mechanism 48 is fastened to the guide and post member 109 of the lower leg assembly 54 with which the clamp mechanism is associated as by appropriate screws (not shown). The bends 148 and 150 at the ends of flat section 146 are trained around, and embrace, the parallel posts 84 and 86 of upper tripod leg assembly 52; and cam 140 and brackets 138 and 142 are positioned on the inner side of the tripod leg to protect them from inadvertent damage if the tripod leg is struck or the tripod dropped.

Cam 140 is rotatably supported from the two legs 152 and 154 of cam-supporting bracket 138 (see also FIG. 3) by a pivot member 156 oriented parallel to, but offset from, the axial centerline 158 of the cam. Therefore, as cam 140 is rotated in a clockwise direction (with the clamping mechansim oriented as shown in FIG. 5) by the operator manipulatable handle or locking lever 160 fastened to it for that purpose, the distance "d" between the free end of flexible strap 134 and the nearest surface portion of the cam is decreased and the ends of strap 134 are pulled together. This results in strap 134 in effect being shortened and therefore clamping upper tripod leg assembly posts 84 and 86 against lower tripod leg assembly guide and post member 109 to lock the two leg assemblies together in the wanted, extended (or retracted) relationship. Conversely, as the handle (and cam 140) are rotated in the opposite, counterclockwise direction, flexible strap 134 relaxes, increasing distance "d" and allowing lower tripod leg assembly guide and post member 109 to slide along the posts 84 and 86 of the upper tripod leg assembly.

With the clamping mechanism in the locked configuration shown in FIG. 5, the cam-mounted locking lever 160 lies flat against the guide and post member 109 of lower tripod leg assembly 52. In this position, there is little chance of the locking lever being snagged or struck and the clamping mechanism thereby being damaged.

As is shown in FIGS. 3 and 5, adjusting screw 144 extends through the bracket 142 fixed to the free end of flexible strap 134, and it is threaded into the base 162 of cam-supporting bracket 138. Consequently, by rotating the adjustment member, the cam-supporting bracket can be drawn toward fixed bracket 142 to increase the clamping force exerted by strap 134 when the clamping mechanism is in the locked configuration shown in FIG. 5.

It is of course not essential that cam 140 have a circular configuration. For example, it may instead have an elliptical shape. In that case, it is likewise not necessary that off centered mounting of the cam be employed.

Also, the bracket 142 at the free end of strap 134 can be eliminated, the end of the strap bent outwardly at an angle to form a flange, and the threaded adjusting member 144 installed in that flange.

In the exemplary tripod 40 just discussed, the tripod head 42 and bushing 96 are fabricated of an engineering thermoplastic such as the ultra high molecular weight polyethylene sold under the name TIVAR 100 by Indiana's Polyhi Corporation. That material is preferred because of its color fastness, its self-lubricated properties, its impact resistance, and its resistance to chemical attack and ultraviolet degradation.

The parallel, elongated posts 84 and 86 of upper tripod leg assembly 52 are fabricated of a fiberglass reinforced, phthalic polyester; and they are supplied by the Aickins Corporation of Tukwila, Wash. under the designation Weather Max 5000. These posts are approximately 33 inches long.

As an option which can be employed to further increase the rigidity of tripod legs 44, these posts 84 and 86 can be replaced with posts 164 fabricated from TIVAR 100 tubes 166 reinforced with a solid wooden core 168 as shown in FIG. 4, for example.

The guide and post members 109 of the lower tripod leg assemblies 54 are also preferably fabricated from TIVAR 100. in the illustrated tripod 40, this component is 2.57 inches wide, 1 inch thick, and approximately 36 inches long.

To most conveniently store or carry tripod 40, the lower tripod leg assemblies 54 are retracted relative to the upper leg assemblies 52 by moving them in the direction shown by arrow 56 in FIG. 1 until the upper end of lower tripod leg assembly guide and post member 109 is stopped by the cross member 88 at the upper end of upper tripod leg assembly 52, and the three tripod legs 44 are collapsed toward the vertical centerline of the tripod until they are in engagement. To set up the tripod from that configuration, the tripod legs are spread by pivoting them outwardly about pivot members 98 (in one tripod of the character shown in FIGS. 1-4, the tripod legs 44 can actually be rotated outwardly until they reach an angle of 20° above the level of tripod head 42). Next, the clamping mechanisms 48 and 50 are unlocked; and the lower tripod leg assemblies 54 are extended until the tripod head 42 is at the appropriate height above the supporting stratum and is level. Then, the clamping mechanisms are locked by rotating their operating levers 160 to the position shown in FIG. 5. Finally, the person setting up the tripod can step in turn on each of the three foot-supported pegs or drive platforms 130 to drive spikes 126 into the supporting stratum.

It is to be understood, in conjunction with the foregoing, that the sequence of steps their specified is merely exemplary and that these steps may be carried out in any desired order in the process of setting up or taking down tripod 40.

Referring again to the drawing, FIGS. 6-22 depict a tripod 170 which embodies the same principles as the tripod 40 decribed above but differs from the latter in many structural details. Because of the similarity of the two tripods 40 and 170, those components of the latter which are comparable to components of tripod 40 have been identified by the same reference characters but followed by the letter "a" (the same scheme of using common reference characters followed by letters will also be employed in describing those tripods of the present invention illustrated in FIGS. 23-38).

Turning first to FIGS. 6-12, the head 42a of tripod 170 has the same hexagonal configuration as the head 42 of tripod 40. And it has an upper, flat portion of generally uniform thickness which provides an instrument mounting platform 64a. Integral with the mounting platform and depending therefrom at locations centered on the longer sides 60a of the platform are three tripod leg mounting flanges 66a having pivot member accepting bores 100a extending transversely therethrough.

On either side of each depending, integral mounting flange 66a is an arcuate bearing surface 172 or 174. These bearing surfaces are formed in a generally triangular boss 176 (see FIG. 9) which is also integral with, and depends from, the mounting platform 64a of tripod head 42a.

Finally, like tripod head 42, the tripod head identified by reference character 42a has a vertically oriented, centrally located aperture 82a which extends from top to bottom of tripod head 42a through instrument mounting platform 64a and the integral, depending boss 76 on which the three arcuate pairs of bearing surfaces 72 and 174 are formed.

Like the upper tripod leg assemblies of tripod 40, those incorporated in tripod 170 and identified by reference character 52a (see FIGS. 6-8 and 14-19) include two hollow, elongated, parallel posts, here 84a and 86a. The upper ends of the posts 84a and 86a of each upper tripod leg assembly 52a are pressed into complementary blind recesses 178 and 180 (see FIGS. 14 and 15) which are formed in two cylindrical, rolling bearings 182 and 184.

The latter components have cylindrical peripheral surfaces 185 and 186 which are configured to match, and be seated against, the tripod head incorporated, arcuate bearing surfaces 172 and 174 on that side 60a of tripod head 42a where the tripod leg 44a having a particular pair of bearings 182 and 184 is to be pivotably attached to tripod head 42a. By virtue of this novel bearing arrangement, tripod legs 44a furnish even more support for a tripod head than the legs 44 of tripod 40 do. This significantly, and desirably, further increases the stability afforded an instrument mounted on the platform 64a of tripod head 42a.

Apertures 188 and 190 are formed through the bearings 182 and 184 of each tripod leg 44a. The pivot member 98a employed to secure the tripod leg to this depending flange 66a extends through these apertures 188 and 190 as well as through the aperature 100a in flange 66a and through the aligned apertures 102a and 104a formed in the upper ends of upper tripod leg assembly posts 84a and 86a. Members 98a thereby pivotably connect both the bearings and posts 84a and 86a and, consequently, the tripod leg 44a to the tripod head 42a.

Figure 7:
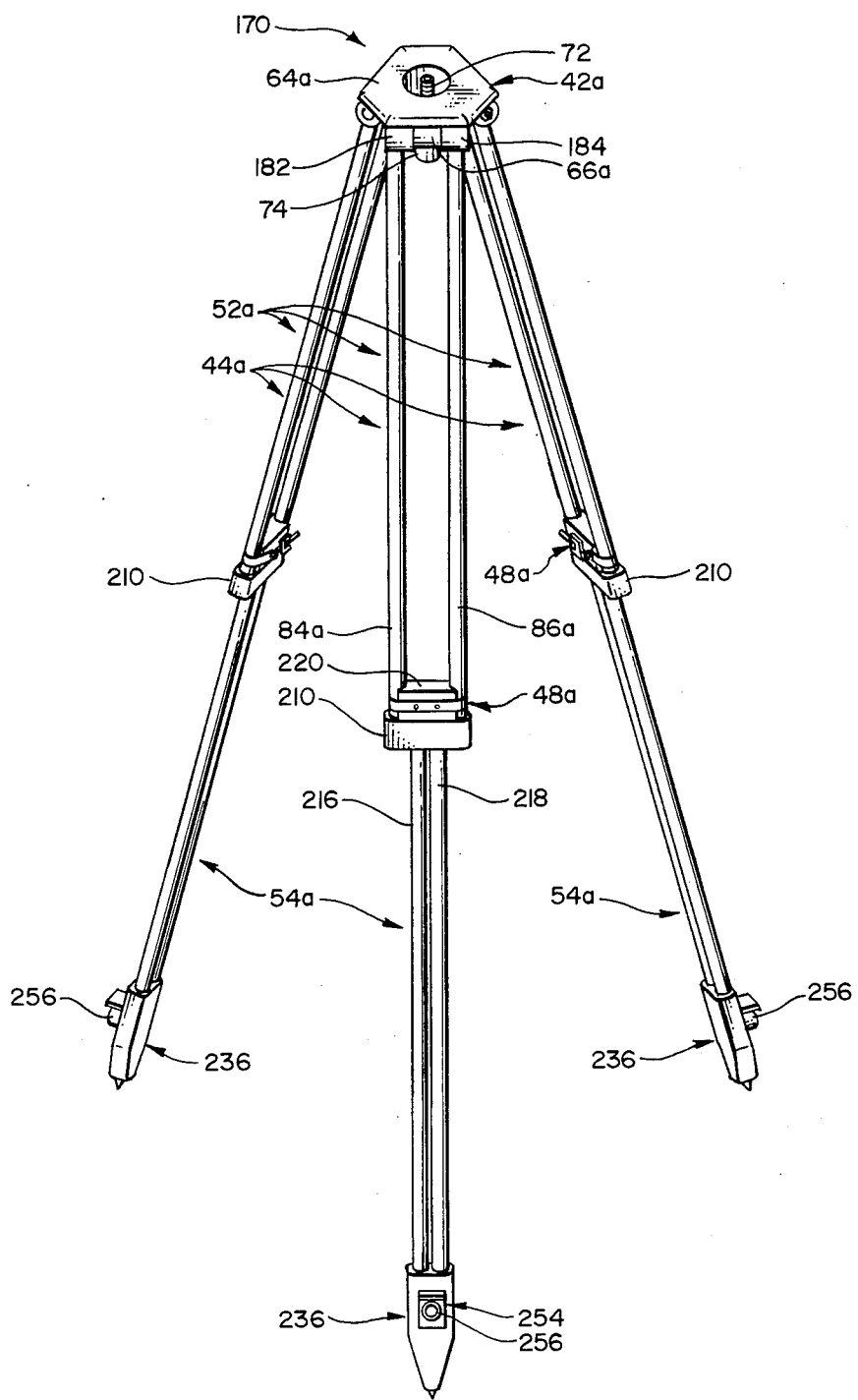
FIG. 7 is a perspective view of the tripod shown in FIG. 6, but with the tripod legs fully extended.

In this embodiment of our invention, a Nylok retainer 192, or the equivalent, is preferably employed to clamp the two bearings 182 and 184 against the opposite sides 194 and 196 of the depending mounting flange 66a that generate the frictional force relied upon to retain the tripod leg 44a in its collapsed position or in a spread position such as one of those shown in FIGS. 6 and 7, for example.

Also, in this version of our invention, the square shank 198 of pivot member 98a is fitted into a correspondingly dimensioned, square recess 202 at the outer end of the through bore 190 (or 188) at that end of the bearing 182 or 184 facing the head 203 of the pivot member. This rotatably couples the pivot member to the bearing so that member 98a rotates with tripod leg 44a as the latter is swung between its collapsed and spread positions. This also contributes materially to the rigidity and stability of tripod 170.

As is perhaps best shown in FIG. 15, those recesses 178 and 180 in bearings 182 and 184 which accommodate the upper ends of upper leg assembly posts 84a and 86a are located nearer one end of the bearing than the other. This is a significant assembly feature in that it permits bearings of the same dimensions to be employed to connect legs of different widths to an associated tripod head. That is, by turning one or both of the bearings shown in FIG. 15 end-for-end, those bearings could be employed to couple to an associated tripod head legs with a smaller width than the exemplary leg 44a shown in that figure (see FIG. 27) in which reference characters "y" and "x" respectively denote the span between widely and narrowly spaced upper tripod leg assembly posts.

The upper leg assemblies 52a of tripod legs 44a also differ from the corresponding upper leg assemblies of tripod 40 in that the lower ends of the posts 84a and 86a incorporated in those legs are fitted into recesses 204 and 206 which open onto the upper surface 208 of a fixed guide or cross member 210 as is best shown in FIGS. 15 and 19. The lower ends of upper leg assembly posts 84a and 86a are pinned in recesses 204 and 206; i.e., clamped to guide 210, as by setscrews 212 and 214.

In tripod 170, the guide and post functions served by the single strut 109 of lower tripod leg assembly 54 in tripod 40 are divided between a pair of elongated, tubular, hollow posts 216 and 218 and a slidable guide 220 as can best be appreciated from FIGS. 6–8 and 15. The two posts 216 and 218 of lower tripod leg assembly 44a are slidingly fitted in complementary bores or passages 222 and 224 through the fixed guide 210 of upper tripod leg assembly 52a (see FIGS. 8, 15, 18, and 19).

The upper ends of the posts 216 and 218 of lower tripod leg assembly 54a fit into similarly dimensioned, blind recesses 226 and 228 opening onto the lower surface 230 of the slidable lower tripod leg assembly guide 220, and they are pinned to that guide member with setscrews 232 and 234 (see FIG. 16).

The sliding and fixed guides 210 and 220 confine lower tripod leg assembly 54a to a rectilinear path as that leg assembly is extended and retracted with respect to upper leg assembly 52a. In particular, the lower leg assembly 54a is confined to the wanted, rectilinear path by lower, fixed guide 210 guiding posts 216 and 218 of the lower leg assembly and by the sliding movement of upper guide 220 along the posts 84a and 86a of the upper tripod leg assembly 52a.

In the embodiment of our invention illustrated in FIGS. 6–22, lower leg assembly 52a has a detachable, rather than integral, foot. That leg assembly component is best shown in FIGS. 8, 15, 20, and 21 and identified by reference character 236. Like the foot 110 of tripod 40, that employed in tripod 170 has a generally rectangular section; sides 238 and 240 which taper inwardly toward the bottom 242 of the foot; and a replaceable, pointed spike 126a threaded into the bottom 242 of the foot.

Tripod leg foot 236 also has two axially extending recesses 244 and 246 formed therein. The lower ends of the posts 84a and 86a of lower tripod leg assembly 54a are seated in these recesses and retained in place by bolt 248 and retainer 250 with the bolt 248 spreading the posts apart to thereby clamp them against the sides of recesses 244 and 246. This nut and bolt combination is also employed to secure to the outer side 252 of the foot an L-shaped drive plate 254 for pressing spike 126a into a supporting stratum and a cylindrical drive plate support 256 against which the upper, horizontal leg 258 of the installed drive plate 254 rests. As is best shown in FIG. 22, both the bolt head and nut are recessed so that they will not accidentally snag or otherwise pose the problem that a projecting part might.

Figure 8:
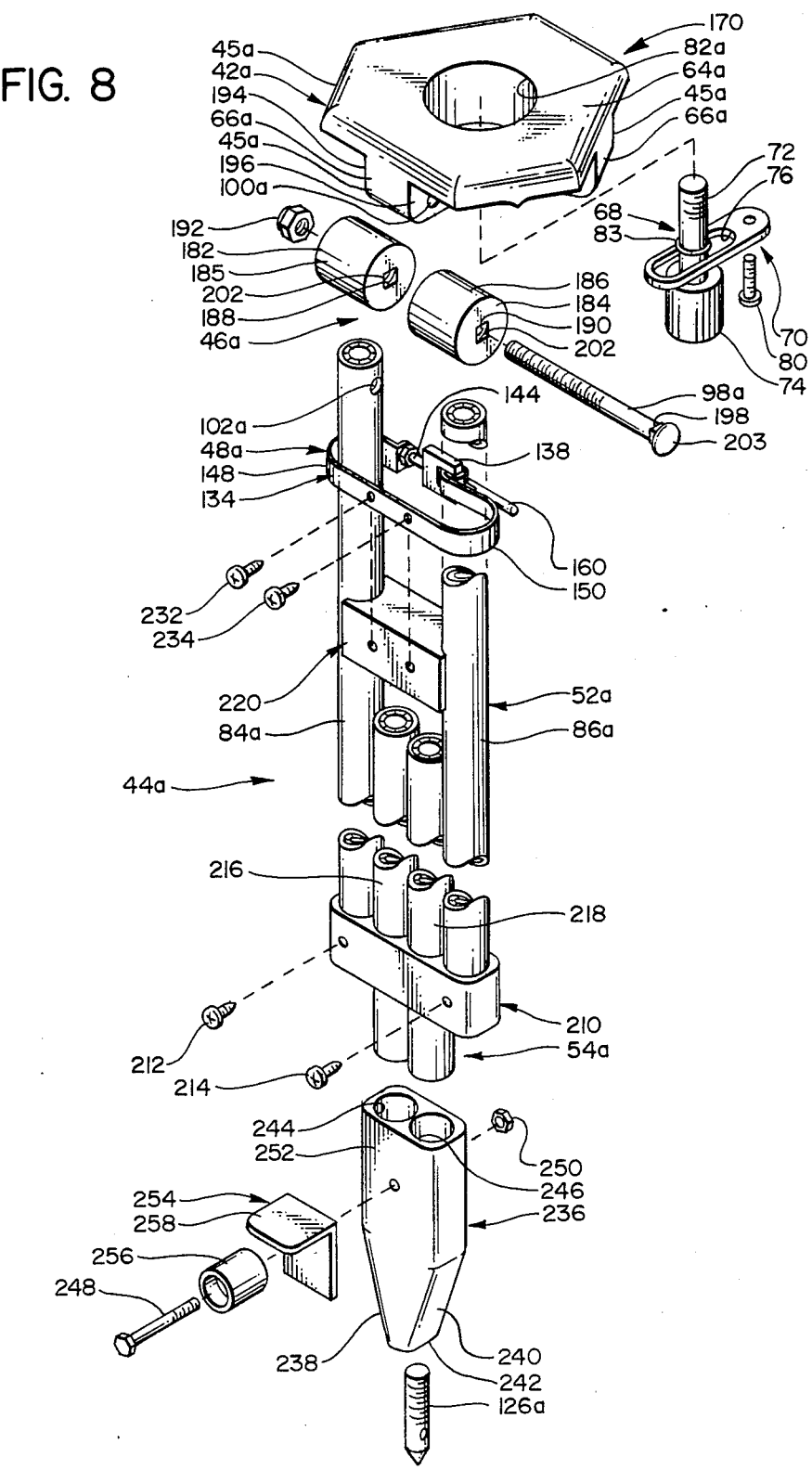
FIG. 8 is a fragmentary, exploded, perspective view, partially broken away and partially in section, of various components of the tripod shown in FIGS. 6 and 7.
Figure 9:
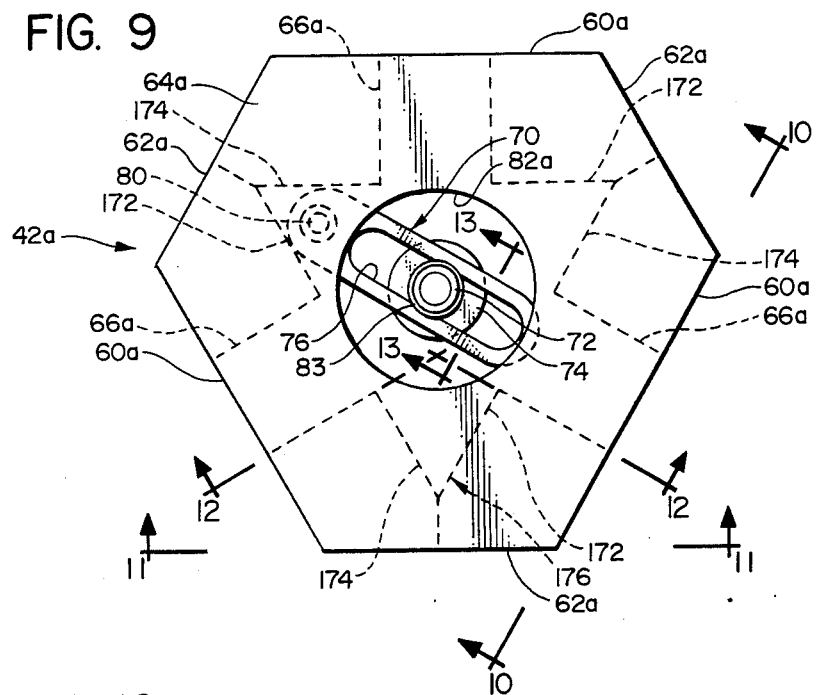
FIG. 9 is a top plan view of a tripod head which is employed in the tripod of FIGS. 6 and 7 and which might also be employed with the tripod of FIG. 1.
Figure 10:
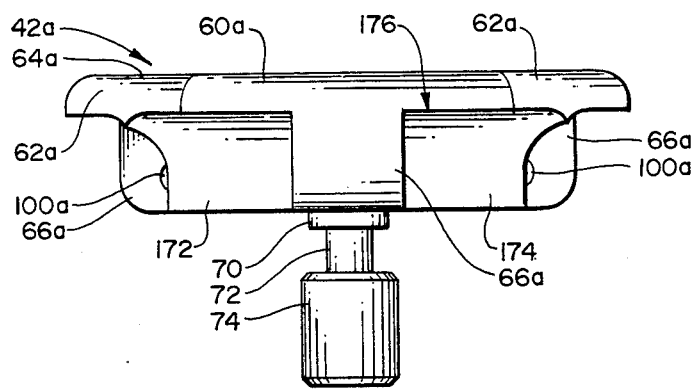
FIG. 10 is a side view of the tripod head depicted in FIG. 9, looking along line 10—10 of FIG. 9.
Figure 11:
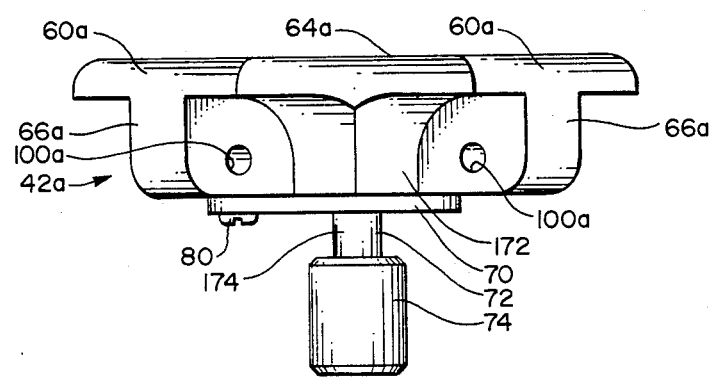
FIG. 11 is a side view of the tripod head depicted in FIG. 9, looking along line 11—11 of FIG. 9.
Figure 29:
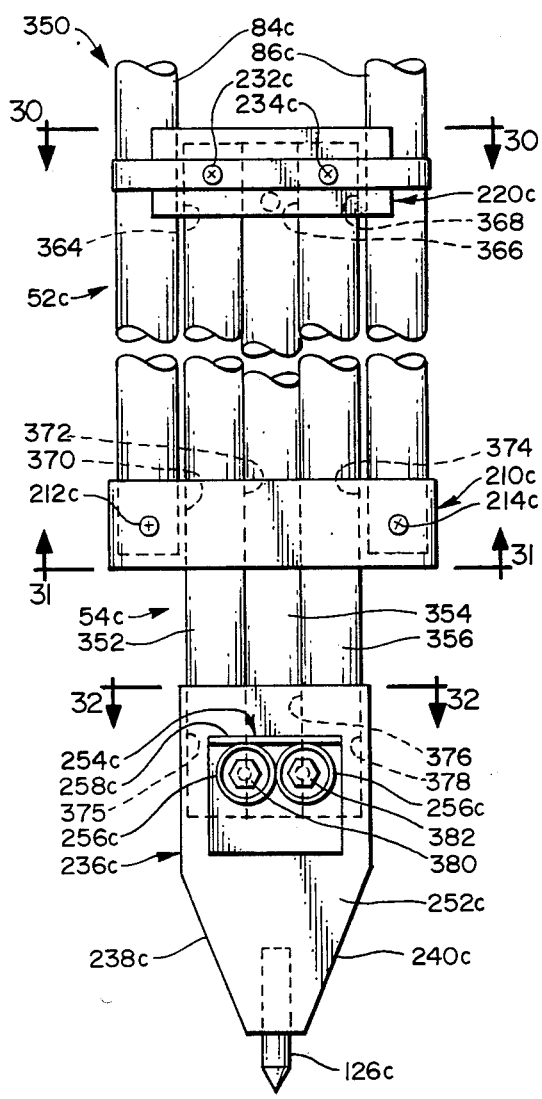
FIG. 29 is a fragmentary front view of yet another modified leg assembly embodying features of the present invention and designed for applications where increased rigidity of the tripod leg is wanted.
Figure 30:
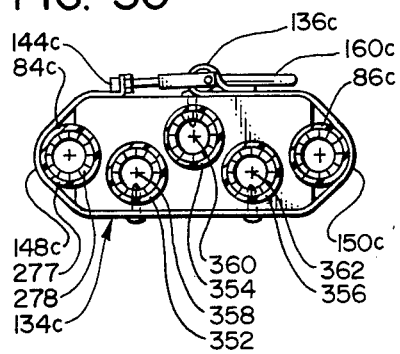
FIG. 30 is a plan view, partially in section and taken substantially along 30—30 of FIG. 29, and illustrating details of a slidable, lower tripod leg assembly guide employed in the modified tripod leg of FIG. 29.
Figure 31:
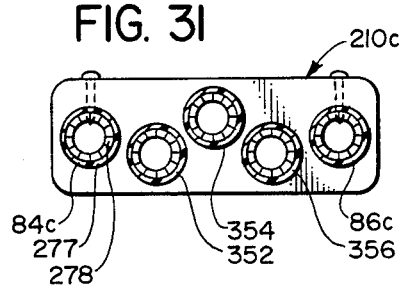
FIG. 31 is a bottom plan view, partially in section and taken substantially along line 31—31 of FIG. 29, to show details of a modified, fixed guide employed at the lower end of the upper leg assembly of the modified tripod leg shown in FIG. 29.
Figure 32:
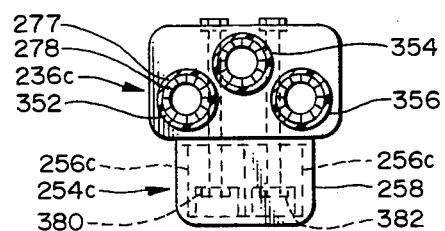
FIG. 32 is a top view, partially in section and taken substantially along line 32—32 of FIG. 29, and illustrating details of the modified tripod foot assembly employed with the tripod leg shown in FIG. 29.

Referring now in particular to FIGS. 8, 15, and 16, each leg 44a of tripod 170 has a single cam-operated, overcenter-type clamping mechanism for locking its upper and lower leg assemblies 52a and 54a together in the collapsed relationship shown in FIG. 6 or in any one of an infinite number of extended positions such as that shown in FIG. 7. Clamping mechanism 48a is a duplicate of the above-described clamping mechanism 48 employed in tripod 40. It is carried by the slidable guide 220 of lower tripod leg assembly 54a to which its flexible band 134a is attached as by the setscrews which clamp the upper ends of the lower tripod leg assembly posts 216 and 218 to that guide.

As is most readily apparent from FIGS. 15 and 16, the strap 134a of clamping mechanism 48a effects the wanted locking action by squeezing the two posts 84a and 86a of the upper tripod leg assembly 52a in which it is incorporated against the slidable guide 220 at the upper end of lower tripod leg assembly 54a to prevent relative movement between the two tripod leg assemblies. Thus, guide 220 is the equivalent of the guide and post member 109 of tripod 40 insofar as it guides the lower leg assembly 54a as the latter is extended and retracted and functions in a similar manner in the locking together of the two tripod leg assemblies 52a and 54a.

A final important component of tripod 170 is the battery hanger 266 illustrated in FIG. 15. That wirelike component has a bail 268 on which an instrument powering battery (not shown) can be hung, arms 270 and 272 extending at right angles from the opposite ends of the bail, and inturned fingers 274 and 276. Those fingers fit into recesses (not shown) in the hollow, tubular posts 84a and 86a of that upper tripod leg assembly 52a to which the bail is attached.

That a battery can be supported at all from a tripod designed for the purposes we have in mind is a tribute to that tripod's rigidity and stability. Batteries of any significant weight can typically not be hung on heretofore available tripods because once the instrument has been set up, the added weight of the battery is sufficient to cause misalignment of the instrument supported by the tripod in applications requiring a high degree of precision.

Except for posts 84a, 86a, 216, and 218 and the parts made of metal, the components of tripod 170 will typically be fabricated from TIVAR 100 or a comparable engineering thermoplastic as will the comparable components of the tripods described hereinafter. The posts of those tripods will typically consist of a fiberglass reinforced, phthalic polyester tube surrounding a hollow, corrugated, polyamide core (the sleeves and cores are identified by reference characters 277 and 278 in FIGS. 16–21 and in succeeding figures in which the posts of other embodiments of our invention are shown in section). As was indicated above, posts of that character are available from the Aickins Corporation of Tukwila, Washington.

Tripods equipped with drive points or spikes such as those described above are designed for strata into which the spikes can be driven by stepping on the tripod's foot-mounted drive plates. When the tripod is instead to be utilized in applications where the supporting stratum cannot be penetrated by a spike, the feet at the lower ends of the tripod legs may be replaced with feet equipped with a tiltable shoe. Tripod leg feet of that character are identified by reference characters 280 in FIGS. 23 and 24 and by reference character 282 in FIGS. 25 and 26.

Tripod foot 280 is identical to the tripod foot 236 described above except that a stud 283 rather than a spike 126a is threaded into the recess 284 opening onto its lower surface 286. Threaded onto that lower portion 288 of the stud projecting below the foot is a bracket 290 with a bifurcated lower portion 292. Pivotably supported by a bolt 294 with a recessed head and a recessed nut 296 between the bifurcations of this bracket for rotation toward and away from the vertical centerline of the tripod in which the shoe is incorporated, as indicated by arrow 297 in FIG. 23, is the vertical flange 298 of a shoe 300. This component also includes a horizontally oriented base 302 adapted to rest upon the surface from which the tripod is supported. Preferably, the bottom of base 302 is surfaced with a non-skid material as indicated by reference character 304 to optimize resistance to skidding.

The tripod foot 282 illustrated in FIGS. 25 and 26 differs from the tripod foot 280 just described primarily in the manner in which an also inwardly/outwardly tiltable shoe, there identified by reference character 300a, is attached to the tripod foot. In particular, there is a slot 306 which extends from the outer side 308 of tripod foot 282 to the inner side 310 of that foot and opens onto the bottom 312 of the foot. The vertical web 298a of the tiltable shoe 300a is pivotably secured to foot 282 in that slot as by cap screw 294a and nut 296a.

It is well within the scope of our invention to provide tripods with more than one extensible tripod leg assembly so that the tripod can be easily handled and set up, yet extended to a height greater than the height that can be conveniently obtained by extensible legs such as those discussed above and identified by reference characters 44 and 44a. A tripod leg of this character, which provides a larger extension; i.e., a greater extended-to-retracted length ratio, is illustrated in FIG. 28 and identified by reference character 316.

Leg 316 includes an upper tripod leg assembly 52b which may duplicate the upper leg assembly 52a described above, but will typically be wider; an intermediate leg assembly 318; and a lower leg assembly 54b, which may be a duplicate of the above-described lower tripod leg assembly 54a except, again, for its dimensions.

The intermediate leg assembly 318 of tripod leg 316 includes hollow, elongated, parallel posts 320 and 322 of the character described above, a slidable, upper guide 323, and a lower guide 324 which, though movable, is more akin in function to the fixed guide 210b of upper tripod leg assembly 52b.

The upper ends of intermediate tripod leg assembly posts 320 and 322 are seated in blind recesses 325 and 326 which open onto the lower surface 328 of upper guide 323. The posts are secured in place by setscrews 330 and 332 which also fix to upper guide 323 the flexible strap 134b of a clamping mechanism which may duplicate those described above. This clamping mechanism is employed to lock together, in a retracted or extended relationship, the upper and intermediate assemblies 52b and 318 of tripod leg 44b.

The posts 320 and 322 of intermediate tripod leg assembly 318 extend downwardly through bores or passages 334 and 336 fashioned in the fixed guide 210b of upper leg assembly 52b. At their lower ends, these posts are seated in blind recesses 338 and 340. Those recesses open onto the upper surface 342 of the intermediate tripod leg assembly lower guide 324 to which the posts 320 and 322 are secured as by setscrews 343. Thus, the intermediate tripod leg assembly 318 is confined to a rectilinear path as it is extended from, and retracted toward, upper leg assembly 526.

The third, lower leg assembly 54b of tripod leg 44b may be a duplicate of the corresponding lower leg assembly 54a described above although its dimensions may be different. The slidable guide 220b of that tripod leg assembly is seated between, and slides along, the parallel, spaced apart posts 320 and 322 of intermediate tripod leg assembly 318, and the posts 216b and 218b of tripod leg assembly 54b extend through bores 344 and 346 in the lower guide 324 of intermediate tripod leg assembly 318. This arrangement confines lower leg assembly 54b to a rectilinear path as that assembly is displaced relative to intermediate tripod leg assembly 318.

A cam-operated clamping mechanism, also identical to that shown in FIG. 5, is employed to lock the intermediate and lower leg assemblies 318 and 54b of tripod leg 44b together in the wanted retracted, or extended, relationship. The flexible strap 348 of that clamping mechanism is shown in FIG. 28. Strap 348 is fixed to the outer side of the lower tripod leg assembly upper guide 220b as by setscrews 260b and 262b. That supports the clamping mechanism in which strap 348 is incorporated from guide 220b in the same manner that clamping mechanism 48a is supported from the upper guide 220 of the lower tripod leg assembly 54a shown in FIGS. 8 and 15.

Tripods with legs such as those illustrated in FIG. 28 are set up and taken down in the same manner as the tripods described previously except that both the lower and intermediate leg assemblies are retracted to optimize the transportability of the tripod and extended to raise the tripod head to the desired level above the supporting stratum.

It has been pointed out on several occasions above that stability is one of the important attributes of the novel tripods disclosed herein. This is due, in large part, to the rigidity of the novel tripod leg constructions we employ such as those previously described herein. A tripod leg constructed with even greater rigidity and designed for particularly demanding applications of our invention is illustrated in FIGS. 29–32 and identified by reference character 350.

Tripod leg 350 is similar to the tripod leg 44a shown in detail in FIGS. 8 and 15 to the extent that it includes an upper leg assembly and a lower leg assembly, here identified by reference characters 52c and 54c, respectively.

Lower leg assembly 54c is, essentially, a duplicate of previously described lower tripod leg assembly 54a except that it has three, rather than two, elongated, tripod head supporting posts. These are identified in FIG. 29 by reference characters 352, 354 and 356. The three posts of the lower leg assembly are arranged in a triangular (isosceles) array, and the longitudinal centerlines 358, 360, and 362 of the three posts are parallel.

The slidable guide member 220c of lower tripod leg assembly 54c also differs from its previously described counterpart in that an increased number (three) of blind recesses 364, 366 and 368 are formed in that component to accommodate the increased number of lower tripod leg assembly posts.

Similarly, the lower, or fixed, guide 210c of upper tripod leg assembly 52c differs from its earlier escribed companion in that there are three through bores 370, 372, and 374 in that component. These accommodate the three posts 352, 354, and 356 of lower tripod leg assembly 54c.

The same modification is made in the foot 236c of tripod leg 350. Three blind recesses are provided in that leg to accommodate the three posts 352, 354, and 356 of lower tripod leg assembly 54c. These recesses are identified by reference characters 375, 376, and 378.

Finally, tripod leg 350 differs from the earlier described, but similar, extensible tripod leg 170 in that the drive plate 254c attached to the outer side 252c of foot 236c is supported by two cylindrical drive plate supports 256c for extra strength. Those supports are arranged in side-by-side relationship under the horizontal flange 258c of the drive plate. Bolts 380 and 382 with recessed heads and appropriate retainers threaded on the latter (not shown) secure the cylindrical drive plate supports to the foot 236c of tripod leg 350.

Figure 33:
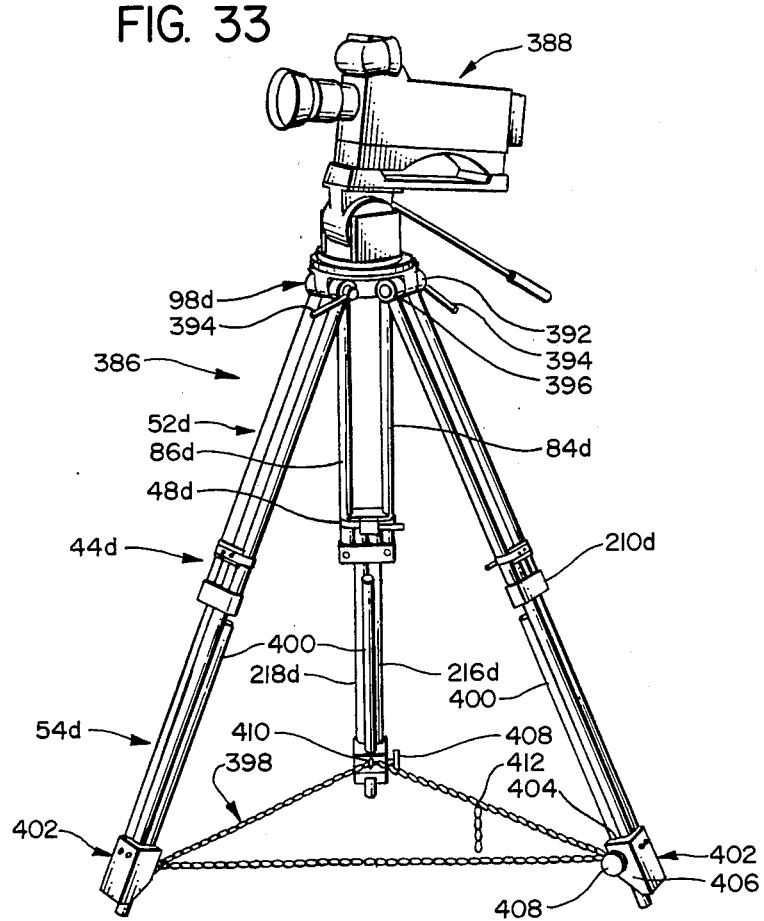
FIG. 33 is a perspective view of yet another tripod embodying features of the present invention; that tripod is uniquely adapted to have a video or motion picture camera mounted thereon.
Figure 34:
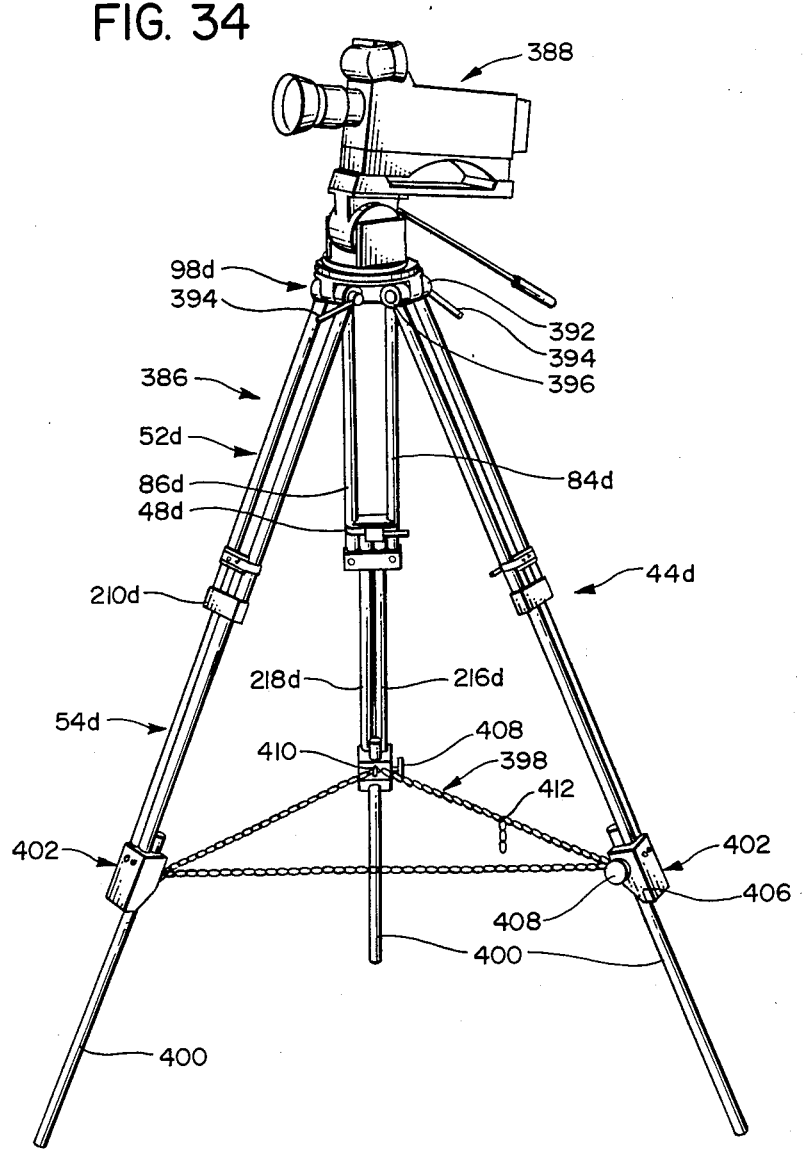
FIG. 34 is a perspective view of the tripod shown in FIG. 33, with the tripod legs fully extended.
Figure 35:
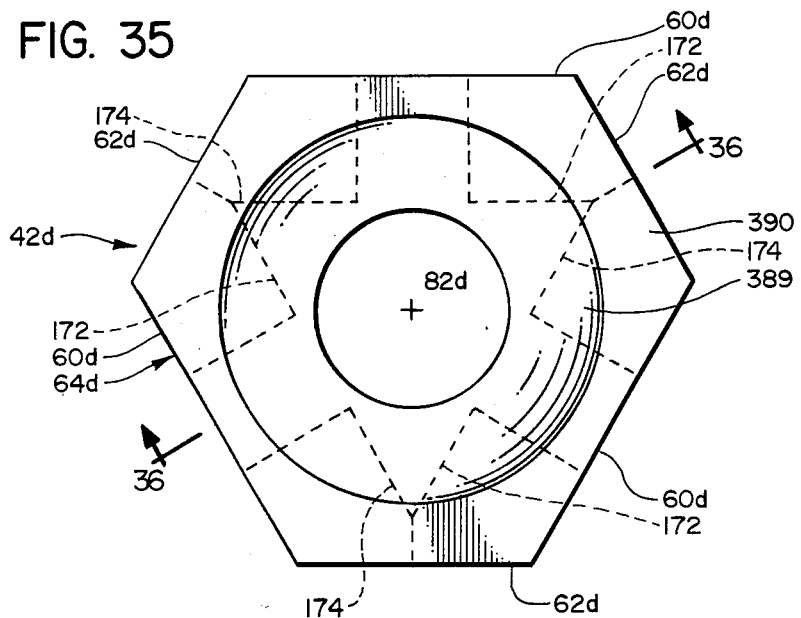
FIG. 35 is a plan view, similar to FIG. 9, of a tripod head which can be employed in a tripod of the type shown in FIGS. 33 and 34.
Figure 36:
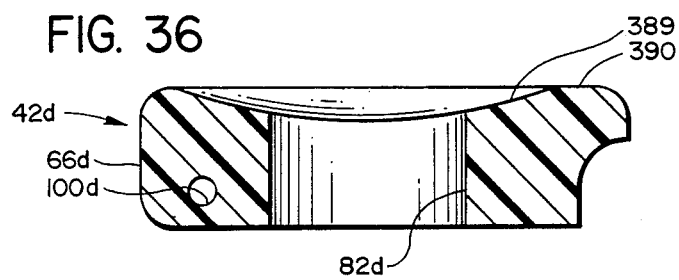
FIG. 36 is a vertical section, taken substantially along line 36—36 of FIG. 35, illustrating further details of the modified tripod head employed in the camera tripod shown in FIGS. 33 and 34.

We pointed out above that tripods embodying the principles of the present invention may advantageously be used to support cameras such as those employed for video recording. A tripod particularly designed for that important application is illustrated in FIGS. 33 and 34 and idenified by reference character 386.

A conventional video camera is identified in the same figures by reference character 388.

While tripod 386 embodies the same important principles of the present invention as the tripods described earlier herein, it does differ from those in several significant respects.

First, the earlier described tripods have a flat platform (64 or 64a) as they are designed to have a surveyor's instrument, laser measuring device, or other instrument with a flat base mounted on the tripod head. The head 42d of tripod 386, in contrast, has a circular, concave dishlike recess 389 formed in, and opening onto the upper surface 390 of, the tripod head's instrument supporting platform 64d. This recess is provided to accommodate the typical, illustrated panning mechanism 390 by which camera 388 is supported from tripod 386 (panning mechanism is conventional and commercially available and not part of the present invention; and it will, accordingly, not be described herein).

Tripod 386 also differs from tripod 170 in that the Nylok retainers employed in tripod 170 to adjust the tension on pivot member 98a and, consequentially, the force required to pivot tripod legs 44a relative to tripod head 42a, have been replaced with internally threaded retainers 392 equipped with locking levers 394; and the retaining members 98d have a socketed head 396. In this alternate arrangement, an Allen wrench, for example, is employed to tension pivot member 98d rotating it while the companion retainer 392 is held stationary. The operator may then fine tune that tension by keeping the pivot member from rotating while manipulating the retainer mounted lever 394.

Tripod 386 also differs from the similarly constructed tripod 170 described above in that it includes a spreader 398 for limiting the extent to which the tripod legs 44d can be spread. Also, each of those tripod legs includes an auxiliary post for increasing the length of the leg and, thereby, the height to which the camera 388 or other instrument supported by the tripod may be elevated above the tripod supporting stratum.

To accommodate the auxilary post (identified in FIGS. 33 and 34 by reference character 400), the foot at the lower end of the lower tripod leg assembly 54d is replaced by a monolithic guide and support member 402 for the auxilary post 400. The lower ends of the lower leg assembly posts 216d and 218d are seated in this support and guide and retained in place in the same manner that the posts are in the foot 236 of tripod 170.

The auxilary post 400 of each tripod leg 54d is slidingly mounted in a through bore 404 formed in the associated support 402. The post can be accordingly displaced between the retracted position shown in FIG. 33 and an extended position such as that shown in FIG. 34.

The auxilary post 400 is locked in the wanted, retracted or extended position by a screw (not shown) which is threaded into the side 406 of support 402. That retaining member can be rotated by a knob 408 fixed to its outer end.

In that embodiment of our invention shown in FIGS. 33 and 34, spreader 398 is a chain trained through eyelets 410 which are threaded into the auxilary post supports 402 on the inner side thereof. A hook 412 is preferably fixed to one end of spreader 398 so that the length of that component can be adjusted to vary the maximum spread of tripod legs 44d.

Those embodiments of our invention thus far described have all employed extensible tripod legs. This versatility is not always required, however; and, when it is not, a much simpler, fixed length leg construction can be employed. The fixed length leg construction is advantageous for a number of reasons including the cost savings that can be realized.

Figure 37:
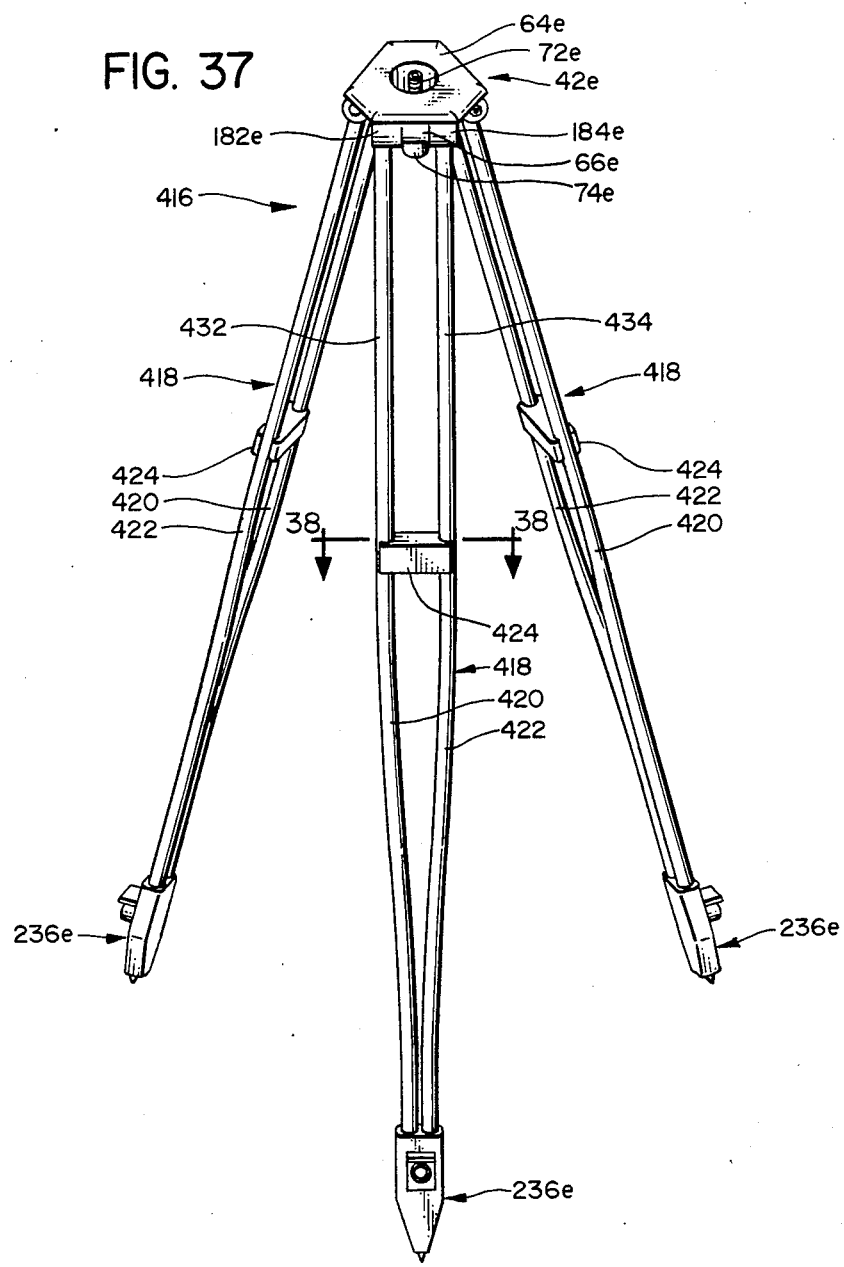
FIG. 37 is a perspective view of yet another tripod embodying features of the present invention, but having fixed length tripod legs.
Figure 38:
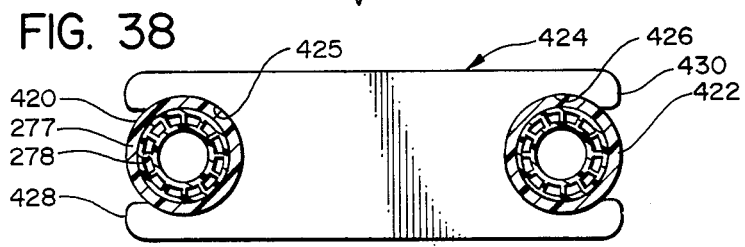
FIG. 38 is a section, taken substantially along line 38—38 of FIG. 37, and showing details of the tripod legs.

A tripod which also embodies the principles of our invention but employs the simpler, fixed length leg construction is illustrated in FIGS. 37 and 38 and identified by reference character 416.

Each of the three legs 418 of tripod 416 includes two elongated, hollow posts 420 and 422. As in the tripods described above with reference to FIGS. 6-36, these posts may have a corrugated, hollow, polyamide core surrounded by a sleeve fabricated from a fiberglass reinforced, isophthalic polyester.

The upper ends of tripod leg posts 420 and 422 are seated in bearings 182c and 184c of the character, and for the purposes, described above; and the posts and bearings are fixed to depending, tripod head flanges 66c in the manner discussed above in conjunction with tripod 170.

The lower ends of posts 420 and 422 are seated in, and attached to, a tripod leg foot 236e, again as discussed in conjunction with tripod 170.

The final component of each tripod leg 418 is a cross member 424 of generally parallelepipedal configuration. This cross member, or brace, is located intermediate the upper and lower ends of the tripod leg 418 in which it is incorporated; and the two posts 420 and 422 of the leg are seated in matching arcuate recesses 425 and 426 which are formed in the opposite ends 428 and 430 of the cross member.

Cross member 424 increases the rigidity of the tripod leg 418 in which it is incorporated. Also, the cross member makes the upper portions 432 and 434 of tripod leg posts 420 and 422 more nearly parallel than they might otherwise be. This is advantageous because, as a result, the forces exerted by the bearings 182e and 184e at the upper end of the tripod leg are more uniformly distributed over the bearing surfaces formed in tripod head 42e (not shown but of the character shown in FIGS. 10 and 11) than they otherwise would be.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What we claim as our invention is:

1. A tripod which comprises: a head, three tripod legs, and means so fixing the upper ends of said legs to said tripod head at equiangularly spaced intervals therearound that said legs can be pivoted toward said head to collapse the tripod into a compact, easily handled configuration and away from the head to provide stable support for an instrument mounted on the tripod head, said head comprising a platform and flanges depending from said platform; there being bearing means incorporated in, and at, the upper ends of said legs; the means for fixing the upper ends of each of said legs to said head comprising a pivot member extending through one of the depending flanges and the bearing means at the upper end of the leg; said head having outwardly facing, arcuate bearing surfaces adjacent the depending, equiangulary spaced flanges at said equiangularly spaced intervals; said bearing means having complementary, convex surfaces contoured to match, and fit against, said bearing surfaces; wherein each of said legs comprises a pair of elongated, parallel, spaced apart posts, wherein said bearing means comprises a bearing member at the upper end of each of said posts; and wherein there are recesses in the bearing members and the upper ends of said posts are fitted into said recesses, and the recesses in the bearing members being offset toward one end of the member in which the recess is formed, whereby different spacings between the elongated posts of a tripod leg as aforesaid can be accommodated by turning said bearing members end for end.

2. An extensible leg for a tripod or the like, said leg comprising: an upper leg assembly and a lower leg assembly which are rectilinearly displaceable relative to each other between a retracted relationship and any one of a plurality of relationships in which one of said leg assemblies is extended with respect to the other of the leg assemblies and means for fixing said upper and lower leg assemblies together in said retracted, or any one of said extended, relationships, one of said leg assemblies comprising a pair of elongated, parallel, spaced apart posts and a fixed guide extending transversely between and fixed to said posts at one end thereof; the other of said leg assemblies including elongated post means located between the posts of said one leg assembly and extending through the guide at the said one end thereof and a second, displaceable guide which spans the space between and slidingly engages the elongated posts of said one leg assembly, whereby said other leg assembly is guided in the aforesaid rectilinear path relative to said one leg assembly as it is extended relative to, and retracted toward, that leg assembly; the means for fixing said leg assemblies together in the collapsed, or an extended, relationship being a clamping assembly which comprises: a flexible strap trained around the parallel, spaced apart posts of said one leg assembly and the displaceable guide of said other extensible leg assembly and means which is operable to so displace one end of said strap toward the other end thereof as to clamp the posts of said one leg assembly to said displaceable guide, a bracket, a rotatable cam, means fixing said cam to said bracket at one end thereof for rotation relative to said bracket about an off-center axis parallel to and spaced from the longitudinal centerline of the cam, and means fixing one end of said flexible strap to the end of the bracket opposite that end to which the cam is fixed, the other end of said strap having therein a loop trained around said cam, whereby rotation of said cam about said off-center axis to decrease and increase the minimum distance between the surface of the cam and said one end of said strap respectively tightens said strap to clamp said leg assemblies together and loosens the strap, allowing said leg assemblies to be relatively rectilinearly displaced as aforesaid; the means for fixing said one end of said flexible strap to said cam-supporting bracket comprising a second bracket fixed to said one end of said flexible strap, and adjusting member extending through said second bracket and threaded into said cam-supporting bracket, and means which can be manually manipulated to vary the distance between said bracket and said one end of said strap and thereby adjust the clamping force which can be exerted by the clamping assembly.

3. Clamping mechanism comprising the combination of: a flexible band, a cam, a cam support bracket, and means for rotatably supporting said cam from said bracket, said bracket including a pair of parallel, spaced apart legs, said cam being disposed between said bracket legs; the means for rotatably supporting the cam from the bracket comprising an axle extending through said bracket legs and through said cam along an axis parallel to but offset from the axial centerline through the cam; there being a loop in one end of the flexible band, said loop surrounding said cam; and said clamping mechanism further comprising: means for fixing the other end of said band to said cam support bracket and means for rotating said cam in one direction in said bracket to tighten said flexible band and in the opposite direction to loosen said band; and the means for connecting said opposite end of said flexible band to said cam-supporting bracket comprising a second bracket fixed to that end of said flexible band and a headed adjusting member extending through said bracket with its head in abuttable relationship thereto, the opposite end of said adjusting member being threaded into the cam-supporting bracket.

* * * * *